US008313883B2

(12) United States Patent
Kwarta et al.

(10) Patent No.: US 8,313,883 B2
(45) **Date of Patent: *Nov. 20, 2012**

(54) ELECTROPHOTOGRAPHIC PRINT BINDING METHOD

(75) Inventors: Brian J. Kwarta, Pittsford, NY (US); James D. Shifley, Spencerport, NY (US); Donald S. Rimai, Webster, NY (US); Thomas N. Tombs, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/785,983

(22) Filed: May 24, 2010

(65) Prior Publication Data

US 2011/0287357 A1 Nov. 24, 2011

(51) Int. Cl.
*G03G 13/20* (2006.01)
*B32B 37/00* (2006.01)

(52) U.S. Cl. .................. 430/124.2; 430/124.1; 156/290; 156/583.1

(58) Field of Classification Search ............... 430/124.1, 430/124.2; 399/408, 409; 156/290, 583.1
See application file for complete search history.

(56) References Cited

U.S. PATENT DOCUMENTS

| | | | | |
|---|---|---|---|---|
| 3,793,016 | A * | 2/1974 | Eichorn | 430/124.1 |
| 3,794,550 | A | 2/1974 | Taillie | |
| 4,343,673 | A | 8/1982 | Smith, Jr. et al. | |
| 5,014,092 | A | 5/1991 | Kubo et al. | |
| 5,140,380 | A | 8/1992 | Nakamura et al. | |
| 5,213,560 | A | 5/1993 | Crowley | |
| 5,328,438 | A | 7/1994 | Crowley | |
| 5,531,429 | A | 7/1996 | Clark | |
| 5,582,570 | A | 12/1996 | Crowley | |
| 6,099,225 | A | 8/2000 | Allen et al. | |
| 6,394,728 | B1 | 5/2002 | Boss | |
| 6,485,606 | B2 | 11/2002 | Boss | |
| 6,577,845 | B2 * | 6/2003 | Stevens | 399/408 |

(Continued)

FOREIGN PATENT DOCUMENTS

JP 61-274764 12/1986

(Continued)

OTHER PUBLICATIONS

Whitaker Brothers, Standard Accubind Pro, Website: www.whitakerbrothers.com.

(Continued)

*Primary Examiner* — Christopher Rodee
*Assistant Examiner* — Stewart Fraser
(74) *Attorney, Agent, or Firm* — Roland L. Schindler, II

(57) ABSTRACT

Methods for forming bound electrophotographic prints are provided. In one aspect a method comprises the steps of applying a toner to a receiver to form a toner image with having toner in a binding area and in an image area. The binding area is proximate to a binding edge of the receiver and the image area that is separated from the binding area by an separation area. The toner image is fused to form a print, and a sheet and the prints are stacked with the toner in the binding area of the print confronting the sheet along a binding edge of the sheet. Heat is applied at the binding edges to cause the toner in the binding area to fuse for a second time. A residual portion of the applied heat heats the separation area but the separation area does not heat the image area to an extent sufficient to fuse toner in the image area.

17 Claims, 17 Drawing Sheets

U.S. PATENT DOCUMENTS

| | | | | |
|---|---|---|---|---|
| 6,980,767 | B1 | 12/2005 | Cahill et al. | |
| 7,218,500 | B2 | 5/2007 | Adachi | |
| 7,260,354 | B2 * | 8/2007 | Ishida | 399/409 |
| 2011/0286779 | A1 * | 11/2011 | Kwarta et al. | 399/409 |

FOREIGN PATENT DOCUMENTS

| | | |
|---|---|---|
| JP | 09-109587 | 4/1997 |
| JP | 9-110051 | 4/1997 |
| JP | 09-110285 | 4/1997 |
| JP | 2004-093819 | 3/2004 |
| JP | 2004-126229 | 4/2004 |

OTHER PUBLICATIONS

Whitaker Brothers, MBM AutoBook Bookletmaker, Website: www.whitakerbros.com.

* cited by examiner

ELECTROPHOTOGRAPHIC PRINT BINDING METHOD

CROSS REFERENCE TO RELATED APPLICATIONS

This application relates to commonly assigned, copending U.S. application Ser. No. 12/786,017, filed May 24, 2010, entitled: "ELECTROPHOTOGRAPHIC PRINT BINDING SYSTEM". And U.S. application Ser. No. 12/786,042, filed May 24, 2010, entitled: "ELECTROPHOTOGRAPHIC PRINT BINDING METHOD AND SYSTEM" hereby incorporated by reference.

FIELD OF THE INVENTION

This invention relates to methods that are used to bind electrophotographic prints.

BACKGROUND OF THE INVENTION

Electrophotographic printing systems typically generate prints that are highly valued for their excellent image quality and durability. Such prints become even more valid when combined to form bound products such as books, cards, photobooks, and the like. Accordingly electrophotographic printing systems that can automatically bring prints together are highly desirable.

However, it is not a simple task to bind a stack of pages to make bound product. Conventionally this is done using staples, stitches, or adhesives as is shown for example in JP 09-109587 entitled "Document Binding Apparatus", filed on Oct. 21, 1995, and in JP 09-110285 entitled "Bookbinding Device and Image Forming Device", published on Apr. 28, 1997, and is practiced by the Standard Accubind Pro bookbinder and the MEM AutoBook Bookletmaker sold by Whitaker Brothers, Rockville, Md., USA. It will be appreciated that such approaches require the use of additional consumables to bind the pages and further that in many cases it is necessary to provide several different types of consumables to achieve binding that has a desirable aesthetic appearance. For example, where a single size of adhesive tape is used as binding material, the adhesive tape will have a width that is sized to extend across a stack thickness of a maximum number of prints in the stack. However, where such a single tape is used to bind only a few prints together, excess adhesive material is provided and this excess adhesive material can for example, negatively impact the appearance of the bound product. Alternatively, to the extent that an electrophotographic printing system requires the use of multiple different sizes of binding tape can be used but this in turn creates supply, loading and other logistical problems.

In the area of electrophotographic printing, it has long been proposed to use electrophotographic toner to bind two or more prints together. Typically, this involves applying toner to a page for the dedicated purpose of being used for page binding purposes. The dedicated toner is then fused for a first time to the page. The page with the toner fused to it is stacked with another page or folded onto itself. Pressure and heat are applied across page where the dedicated toner is fused to cause the dedicated toner to fuse for a second time to bind the pages. Examples of this include, U.S. Pat. No. 3,793,016, entitled "Electrophotographic Sheet Binding Process" issued Feb. 19, 1974, which describes the formation of a high density area of toner on a set of sheets and re-fusing the toner between adjacent overlaying sheets to provide bound stacks without requiring additional binding material. Further examples of this approach can be found in U.S. Pat. No. 3,794,550 entitled: "Sheet Binding", issued Feb. 26, 1974, U.S. Pat. No. 5,014,092 entitled: "Image Forming Apparatus with a Binding Function" issued May 7, 1991, U.S. Pat. No. 4,343,673, entitled: "Binding Apparatus and Method" issued Aug. 10, 1982, U.S. Pat. No. 5,582,570, entitled: "Method and Apparatus for Binding Sheets Using a Printing Substance" issued Dec. 10, 1996, U.S. Pat. No. 6,485,606 entitled: "Apparatus for Binding Sheet Media" issued Nov. 26, 2002, Japanese Publication No. 9-110051, published on Apr. 28, 1997, and in JP Publication No. 61-274764.

In such systems, all of the heat used for binding is conveyed into the pages of stack through a top page and a bottom page of the stack. The heat applied at these points must penetrate through the entire thickness of the stack with enough intensity to fuse toner in the middle of the stack. Accordingly, where there are many pages in the stack the amount of heat that must be applied to the top page and to the bottom page to fuse all of the toner provided for binding purposes in such a manner is significant. Further, such heat must be applied over a meaningful amount of time so as to prevent overheating of the top page and bottom page of the stack while still delivering the requisite thermal energy. Both the amount of heat required and the amount of time required increase with the number of pages in the stack.

Importantly, it is to be understood that the heat that is introduced into a stack in this manner does not propagate only through the portion of the pages in the stack having toner that is applied for binding. Instead such heat propagates along the length of the pages as well. This has the effect of heating portions of the pages that are that are not used for binding. Given the amount of heat that must be applied to a stack and the amount of time required to fuse all of the dedicated toner in a stack, the propagation of heat along the pages can cause toner other than the dedicated toner to fuse causing unwanted binding and image damage to images printed on the pages.

Accordingly, other approaches have been proposed for binding stacks of prints using thermally fusable toner as an adhesive. For example, in the '550 patent and the '016 patent it is proposed that a heated dual platen system have "additional heating means provided in a bottom surface against which a stack abuts" and that chemical, pressure or other fusing techniques be used. While additional heat will increase the probability of good binding, such additional heat can increase the total amount of heat applied to the stack and can increase the risk that toner that is fused to a page for a purpose other than binding will be fused in addition to the dedicated toner used for binding.

Alternatively, U.S. Pat. No. 5,582,570, entitled "Method and Apparatus for Binding Sheets using a Printing Substance", issued Dec. 10, 1996, describes a method and apparatus for binding sheets using a reactivatable printing substance such as toner. The apparatus comprises a printing device for applying printing toner to a binding edge of a sheet. Printing text can be applied simultaneously to the sheet by the printing device. The sheet is transferred through a preheat station to an overlay location where additional sheets having strips of toner adjacent to a binder edge thereof are overlaid, one at a time. As each sheet is overlaid, the toner strip on the preceding sheet is fused to the uppermost sheet. Such fusing can be accomplished using a heated platen or wheel that bears upon the uppermost sheet.

This one page-at-a time approach to fusing limits the amount of heat that must be passed through any individual sheet in a stack but can have the effect of reducing output speeds.

Further, it is not clear that the problem of unwanted heating of image forming toner during a second fusing is resolved by fusing one page at a time. For example, the '764 publication discloses a system that is used in cementing products of paper, sheets, etc. especially inscription sheets e.g. single sheet letters. In this system an adhesive is applied at predetermined fixed adhesive points of the product intended for copying printing, etc., then fixed and again activated and thus converted into an adhesive state. The points of the product to be adhered can be cemented together. The adhesive points are produced by means of electrostatic charge. Similarly, the above-referenced '051 publication is directed to solving the problem of easily and costlessly making envelopes without applying an expensive adhesive. In this publication, a toner image for sticking is formed on a part of the peripheral edge and the folding part of a paper. After the paper, has been folded in two, with the toner image at the inside, the part of the toner image is pressed with heat to melt the toner and bind the paper. In this way, the peripheral edge of an envelope is sealed. However, U.S. Pat. No. 7,260,354, entitled "Image Forming Method" issued on Aug. 21, 2007, notes that the heat and pressure applied to cause the toner used for binding in the '764 and '051 publications to fuse for the second time causes the toner for the image portion to fuse resulting in adhesion throughout the toner image. As a result, the toner image is said to deteriorate.

As an alternative, the '345 patent, and JP Publication 2004-126,229, propose the use of special toners that are formulated to include an adhesive that can bind pages together without heating the pages to temperatures that will cause the toner used for image forming to fuse. Specifically, the '345 patent proposes the use of a special toner that fuses at a temperature that is lower than a temperature of the toner used for image formation, while the '229 publication discloses the use of a toner having a pressure sensitive adhesive that can be deposited as a toner and made adhesive by application of pressure in a subsequent binding process. Similarly, U.S. Pat. No. 5,521,429 discloses using toners having and ultraviolet light activated adhesives.

It has also been proposed to apply energy to a stack that will cause the toner in the stack to heat from within. For example, the '429 patent also discloses applying vibration and pressure to generate heat in the fusing heat in the stacks, while U.S. Pat. No. 6,294,728, entitled "Binding Sheet Media Using Imaging Material" issued on May 28, 2002 describes a system that uses two bars to apply pressure and heat for fusing toner bearing sheets but notes that for large stacks of paper it may be necessary to heat through the stack and that additionally a variety of techniques can be used for this purpose including, ultrasound magnetic energy radio frequency energy and other forms of electromagnetic energy.

In summary, despite many decades of development, what is still needed in the art is a method that allows electrophotographic prints to be thermally bound together using a conventional toner while protecting images formed on the prints.

SUMMARY OF THE INVENTION

Methods for forming bound electrophotographic prints are provided. In one aspect a method comprises the steps of applying a toner to a receiver to form a toner image with having toner in a binding area and in an image area. The binding area is proximate to a binding edge of the receiver and the image area that is separated from the binding area by an separation area. The toner image is fused to form a print, and a sheet and the prints are stacked with the toner in the binding area of the print confronting the sheet along a binding edge of the sheet. Heat is applied at the binding edges to cause the toner in the binding area to fuse for a second time. A residual portion of the applied heat heats the separation area but the separation area does not heat the image area to an extent sufficient to fuse toner in the image area.

DETAILED DESCRIPTION OF THE INVENTION

Figure 1:
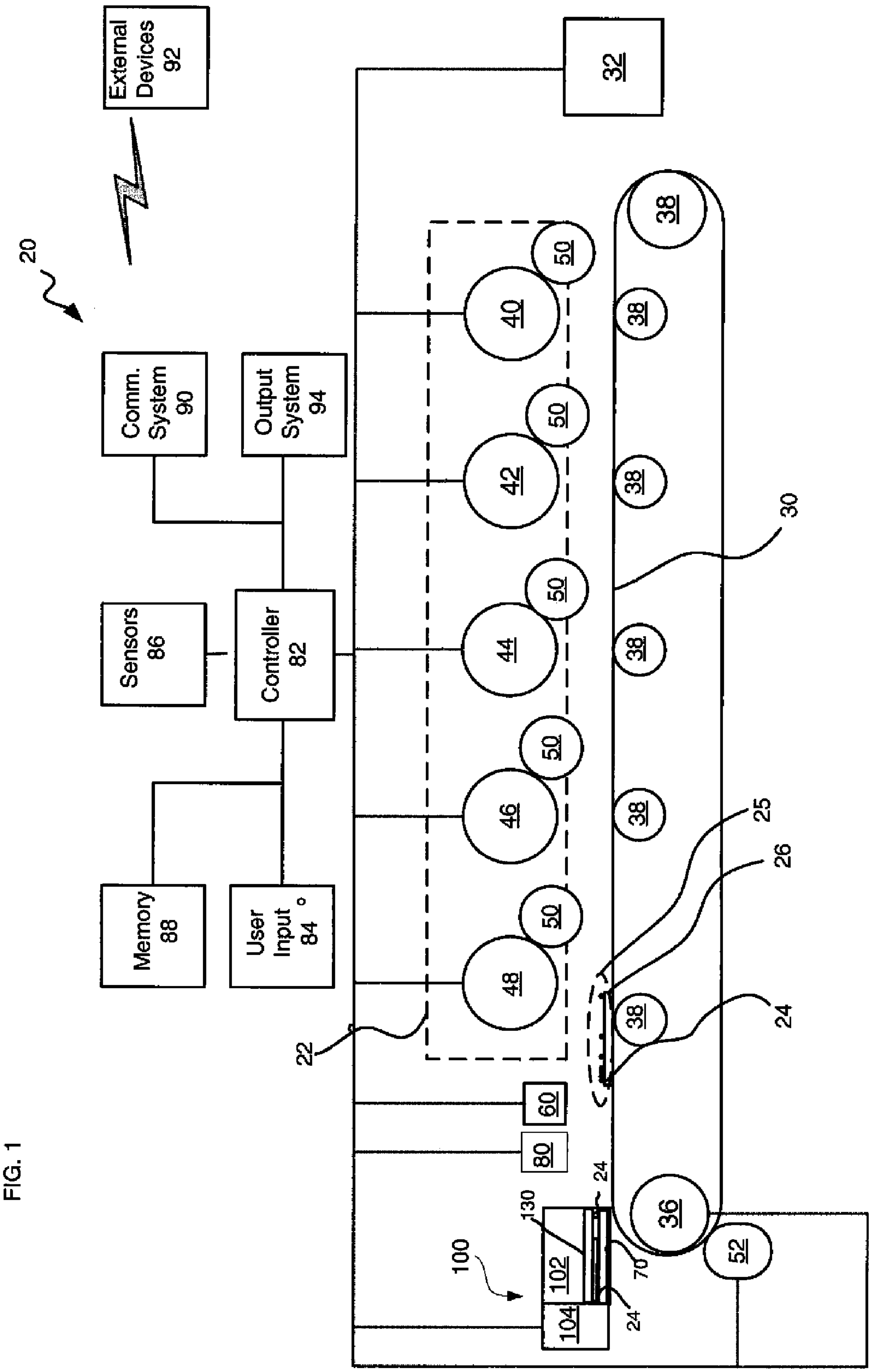
FIG. 1 is a system level illustration of one embodiment of an electrophotographic printer.

FIG. 1 is a system level illustration of an electrophotographic printer 20. In the embodiment of FIG. 1, electrophotographic printer 20 has an electrophotographic print engine 22 that deposits toner 24 to form a toner image 25 in the form of a patterned arrangement of stacks of toner 24. Toner image 25 can include any patternwise application of toner 24 and can be mapped according data representing text, graphics, photo, and other types of visual content, as well as patterns that are determined based upon desirable structural or functional arrangements of the applied toner 24.

Toner 24 is a material or mixture that contains toner particles, and that can form an image, pattern, or coating when electrostatically deposited on an imaging member including a photoreceptor, photoconductor, electrostatically-charged, or magnetic surface. As used herein, "toner particles" are the marking particles used in an electrophotographic print engine 22 to convert an electrostatic latent image into a visible image. Toner particles can also include clear particles that can provide for example a protective layer on an image or that impart a tactile feel to the printed image.

Toner particles can have a range of diameters, e.g. less than 8 μm, on the order of 10-15 μm, up to approximately 30 μm, or larger. When referring to particles of toner 24, the toner size or diameter is defined in terms of the median volume weighted diameter as measured by conventional diameter measuring devices such as a Coulter Multisizer, sold by Coulter, Inc. The volume weighted diameter is the sum of the mass of each toner particle multiplied by the diameter of a spherical particle of equal mass and density, divided by the total particle mass. Toner 24 is also referred to in the art as marking particles or dry ink.

Typically, receiver 26 takes the form of paper, film, fabric, metallicized or metallic sheets or webs. However, receiver 26 can take any number of forms and can comprise, in general, any article or structure that can be moved relative to print engine 22 and processed as described herein.

Returning again to FIG. 1, print engine 22 can be used to deposit one or more applications of toner 24 to form toner image 25 on receiver 26. A toner image 25 formed from a single application of toner 24 can, for example, provide a monochrome image.

A toner image 25 formed from more than one application of toner 24, (also known as a multi-part image) can be used for a variety of purposes, the most common of which is to provide toner images 25 with more than one color. For example, in a four toner image, four toners having subtractive primary colors, cyan, magenta, yellow, and black, can be combined to form a representative spectrum of colors. Similarly, in a five toner image various combinations of any of five differently colored toners can be combined to form other colors on receiver 26 at various locations on receiver 26. That is, any of the five colors of toner 24 can be combined with toner 24 of one or more of the other colors at a particular location on receiver 26 to form a color different than the colors of the toners 24 applied at that location.

In the embodiment that is illustrated, a primary imaging member (not shown) such as a photoreceptor is initially charged. An electrostatic latent image is formed by image-wise exposing the primary imaging member using known methods such as optical exposure, an LED array, or a laser scanner. The electrostatic latent image is developed into a visible image by bringing the primary imaging member into close proximity to a development station that contains toner 24. The toner image 25 on the primary imaging member is then transferred to receiver 26, generally by pressing receiver 26 against the primary imaging member while subjecting the toner to an electrostatic field that urges the toner 24 to receiver 26. The toner image 25 is then fixed to receiver 26 by fusing to become a print 70.

In FIG. 1 print engine 22 is illustrated as having an optional arrangement of five printing modules 40, 42, 44, 46, and 48, also known as electrophotographic imaging subsystems arranged along a length of receiver transport 28. Each printing module delivers a single application of toner 24 to a respective transfer subsystem 50 in accordance with a desired pattern as receiver 26 is moved by receiver transport 28. Receiver transport 28 comprises a movable surface 30, positions that moves receiver 26 relative to printing modules 40, 42, 44, 46, and 48. Surface 30 comprises an endless belt that is moved by motor 36, that is supported by rollers 38, and that is cleaned by a cleaning mechanism 52.

Also shown in FIG. 1 is an optional folding system 80. Folding system 80 can take the form of any type of folding system that can be used to fold prints 70 as described herein.

Referring again to FIG. 1, electrophotographic printer 20 is operated by a controller 82 that controls the operation of print engine 22 including but not limited to each of the respective printing modules 40, 42, 44, 46, and 48, receiver transport 28, receiver supply 32, transfer subsystem 50, to form a toner image 25 on receiver 26 and to cause fuser 60 to fuse toner images 25 on receiver 26 to form prints 70 as described herein.

Controller 82 operates electrophotographic printer 20 based upon input signals from a user input system 84, sensors 86, a memory 88 and a communication system 90. User input system 84 can comprise any form of transducer or other device capable of receiving an input from a user and converting this input into a form that can be used by controller 82. For example, user input system 84 can comprise a touch screen input, a touch pad input, a 4-way switch, a 6-way switch, an 8-way switch, a stylus system, a trackball system, a joystick system, a voice recognition system, a gesture recognition system or other such systems. Sensors 86 can include contact, proximity, magnetic, or optical sensors and other sensors known in the art that can be used to detect conditions in electrophotographic printer 20 or in the environment-surrounding electrophotographic printer 20 and to convert this information into a form that can be used by controller 82 in governing printing and fusing. Memory 88 can comprise any form of conventionally known memory devices including but not limited to optical, magnetic or other movable media as well as semiconductor or other forms of electronic memory. Memory 88 can be fixed within electrophotographic printer 20, or removable from electrophotographic printer 20 at a port, memory card slot or other known means for temporarily connecting a memory 88 to an electronic device. Memory 88 can also be connected to electrophotographic printer 20 by way of a fixed data path or by way of communication system 90.

Communication system 90 can comprise any form of circuit, system or transducer that can be used to send or receive signals to memory 88 or external devices 92 that are separate from or separable from direct connection with controller 82. Communication system 90 can connect to external devices 92 by way of a wired or wireless connection. In certain embodiments, communication system 90 can comprise a circuitry that can communicate with such separate or separable device using a wired local area network or point to point connection such as an Ethernet connection. In certain embodiments, communication system 90 can alternatively or in combination provide wireless communication circuits for communication with separate or separable devices using a Wi-Fi or any other known wireless communication systems. Such systems can be networked or point to point communication.

External devices 92 can comprise any type of electronic system that can generate wireless signals bearing data that may be useful to controller 82 in operating electrophotographic printer 20. For example and without limitation, an external device 92 can comprise what is known in the art as a digital front end (DFE), which is a computing device that can be used to provide images and or printing instructions to electrophotographic printer 20.

An output system 94, such as a display, is optionally provided and can be used by controller 82 to provide human perceptible signals for feedback, informational or other purposes. Such signals can take the form of visual, audio, tactile or other forms.

As is shown in FIG. 1, electrophotographic printer 20 further comprises a binding system 100. In FIG. 1, binding system 100 is integral to electrophotographic printer 20. In other embodiments, binding system 100 can be modularly joinable to electrophotographic printer 20. In still other embodiments, binding system 100 can be a stand-alone device that cooperates with electrophotographic printer 20.

Binding system 100 comprises a stacking system 102 that stacks a print 70 with a sheet 130 for binding and a heating system 104 with a heat source 105 that heats print 70 and sheet 130 in stacking system 102 to fuse toner 24 that is positioned to bind print 70 to sheet 130. As will be described in greater detail below, sheet 130 can be another print 70, an unprinted sheet or any other material that can be stacked with and bound to print 70 to using toner 24.

Figure 2:
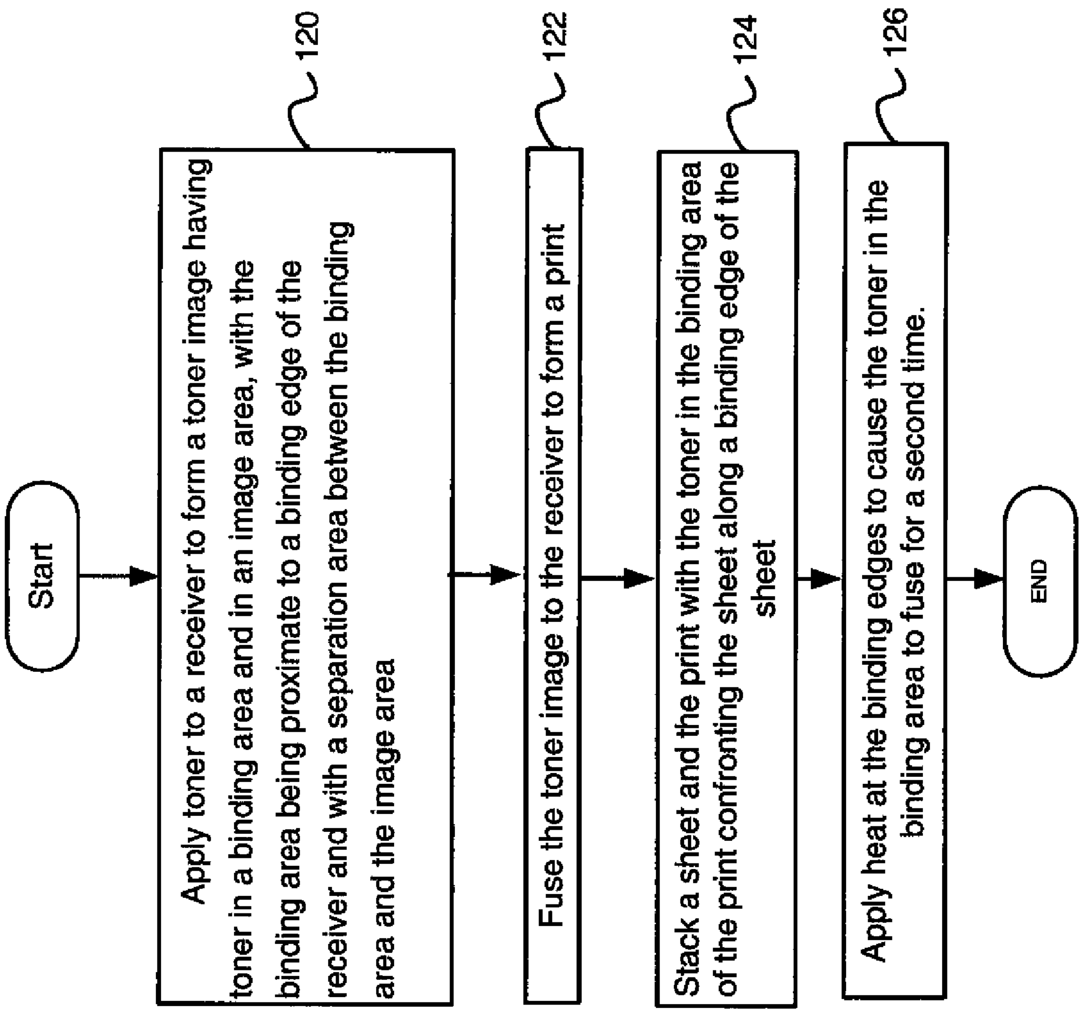
FIG. 2 is a flow chart showing one embodiment of a print binding method.
Figure 3:
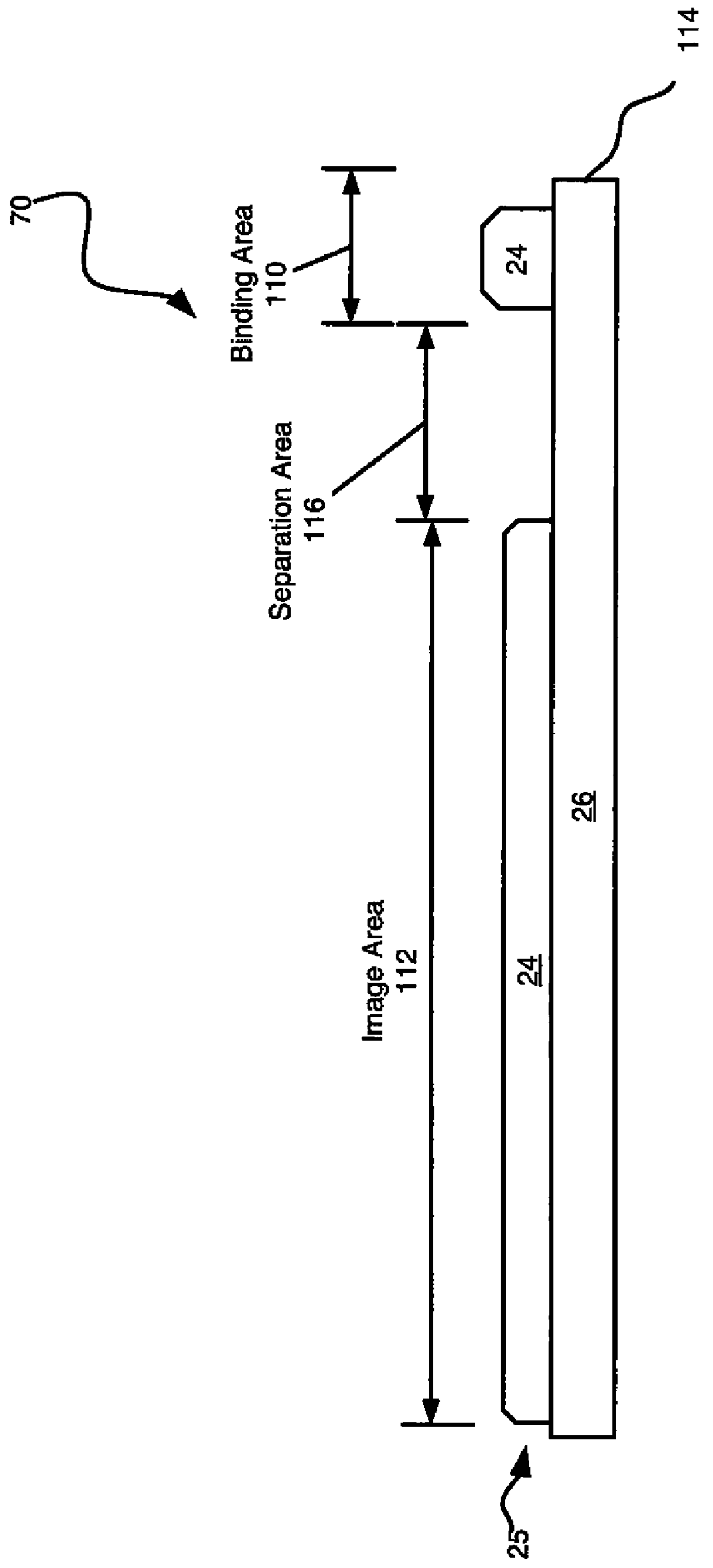
FIG. 3 shows one embodiment of a print.

FIG. 2 shows a first embodiment of a binding method. In the embodiment of FIG. 2, controller 82 causes toner 24 to be applied to a receiver 26 to form a toner image 25 (step 120) having toner 24 in a binding area 110 and in an image area 112 as is illustrated in FIG. 3. As shown, binding area 110 is positioned proximate to a binding edge 114 of receiver 26 and a separation area 116 is between binding area 110 and image area 112. Image area 112 has toner 24 arranged to form images such as text, graphics, photographs, or any other visually or tactilly perceptible markings. Binding area 110 has toner 24 arranged to form a solid or patterned layer of toner 24. Various densities and patterns of various toner 24 can be used in binding area 110 to provide various levels of adhesive between print 70 and sheet 130.

Controller 82 causes the printing of toner image 25 having toner 24 in a binding area 110 when controller 82 determines that a print 70 is to be made that is to be bound to sheet 130. In some embodiments, controller 82 can make this determination based upon print order instructions which provide image information for printing and can include finishing instructions, which can include a request for a bound output product. In other embodiments, signals from user input system 84 can be used to determine that a bound product is to be provided.

Toner image 25 is then fused to receiver 26 to form a print 70 (step 122) as generally described above.

Figure 4:
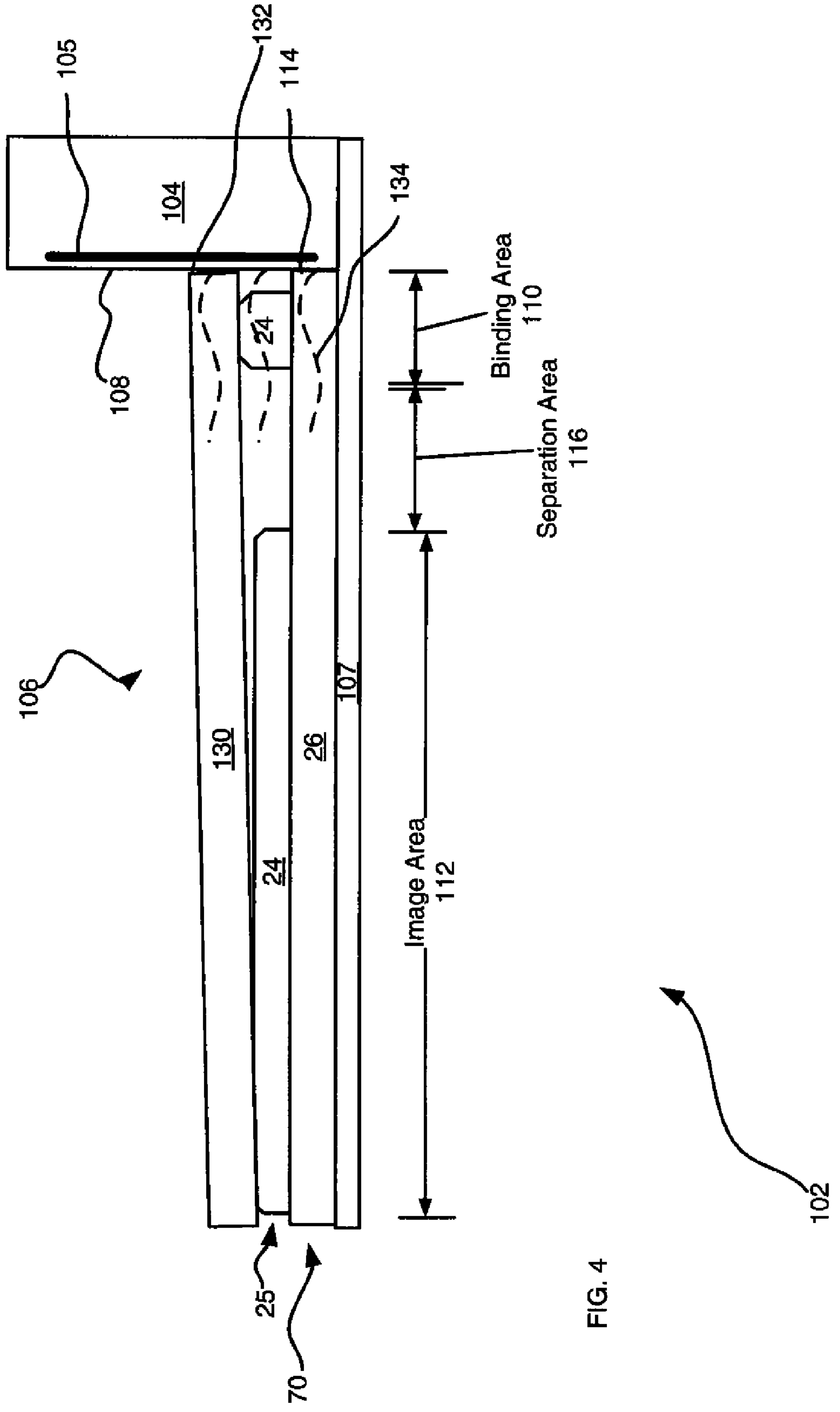
FIG. 4 shows a stacking system having a print and a sheet in the stacking system.

A sheet 130 is then stacked on print 70 such that binding area 110 is between print 70 and sheet 130 (step 124). An example of this is shown in FIG. 4. As is shown in FIG. 4, stacking step (step 124) is performed in stacking system 102. Here stacking system 102 is shown having a stacking area 106 within which print 70 and sheet 130 can be stacked on a base 107. A reference surface 108 is provided at one end of stacking area 106 that can be used to align binding edge 114 of print 70 and a binding edge 132 of sheet 130 during stacking.

In this embodiment of stacking step 124, controller 82 causes print 70 to be deposited first into stacking area 106 with sufficient thrust to allow binding edge 114 to engage reference surface 108, and with binding area 110 positioned in an upward facing direction. In the embodiment of FIG. 1, controller 82 can use receiver transport 28 to provide such thrust. In other embodiments, any known structure or system for print 70 and sheet 130 in stacking area 106 and be used. Controller 82 then causes sheet 130 to be similarly thrust for example, by receiver transport 128 into stacking area 106 with sufficient thrust to allow binding edge 132 to engage reference surface 108. This brings binding edge 132 into alignment with binding edge 114 of print 70 adjacent to reference surface 108 having print 70 with binding area 110 positioned between print 70 and sheet 130.

Heat 134 is then applied at binding edge 114 and binding edge 132 to cause toner 24 in binding area 110 to fuse for a second time (step 126). As is shown in FIG. 4, heat 134 is applied by heating system 104 and heat source 105 through reference surface 108 to heat print 70 and sheet 130 from binding edge 114 and binding edge 110, respectively. The amount of heat 134 applied by heating system 104 can vary based on a type of receiver 26 used to form print 70, a type of toner 24 applied to receiver 26 to make print 70, a type of material used to make sheet 130, an ambient temperature in stacking area 106 proximate to where binding area 110 is positioned for fusing, the glass transition temperature of toner 24, and the amount of heat required to fuse toner 24 in binding areas 110.

It will be appreciated that at least a portion of applied heat 134 will heat portions of print 70 in areas beyond binding area 110 including separation area 116. Heating of separation area 116, in turn, can cause heating of image area 112. In the embodiment illustrated in FIGS. 3, 4, and 5, separation area 116 comprises air and portions of receiver 26 between binding area 110 and image area 112 of print 70. Residual portions of heat 134 are absorbed by the materials in separation area 116, heating separation area 116 and causing the temperature of receiver 26 in separation area 116 to rise. The materials in separation area 116 optionally also emit heat that can be absorbed into the environment surrounding print 70.

The absorption and optionally, emission of the residual portion of heat 134 by materials such as receiver 26 in separation area 116 act to reduce the amount of heat from residual portion of heat 134 such that separation area 116 does not heat image area 112 to an extent sufficient to fuse toner 24 in image area 112 and allow receiver 26 to protect toner 24 in image area 112 from being fused heated by heat 134.

For example, in one embodiment, receiver 26 in separation area 116 has sufficient thermal capacity to absorb enough of the residual portion of the applied heat 134 to allow the separation area 116 to heat without heating image area 112 to an extent that causes toner 24 in image area 112 to fuse. In another embodiment, receiver 26 in separation area 116 has sufficient thermal absorption capacity to absorb coupled with sufficient capacity to emit enough of the residual portion of applied heat 134 to allow receiver 26 in separation area 116 to heat without heating image area 112 to cause toner 24 in image area 112 to fuse. Receiver 26 in separation area 116 can emit heat using for example, radiation, convection, or conduction.

In certain embodiments, controller 82 can determine a size of separation area 116 based upon at least one of the thermal transfer characteristics of receiver 26 in separation area 116, the thermal emission characteristics of receiver 26 in separation area 116, the thermal conductivity of the receiver 26, the thermal characteristics of an environment surrounding the receiver 26 in the separation area 116, and the amount of toner 24 applied in binding area 110.

Accordingly, by providing heat 132 at the binding edge 114 of print 70 and providing separation area 116 between binding area 110 and image area 112 a sufficient amount of applied heat 134 can be provided to fuse toner 24 in binding area 110 without fusing toner 24 in image area 112 for a second time.

Figure 5:
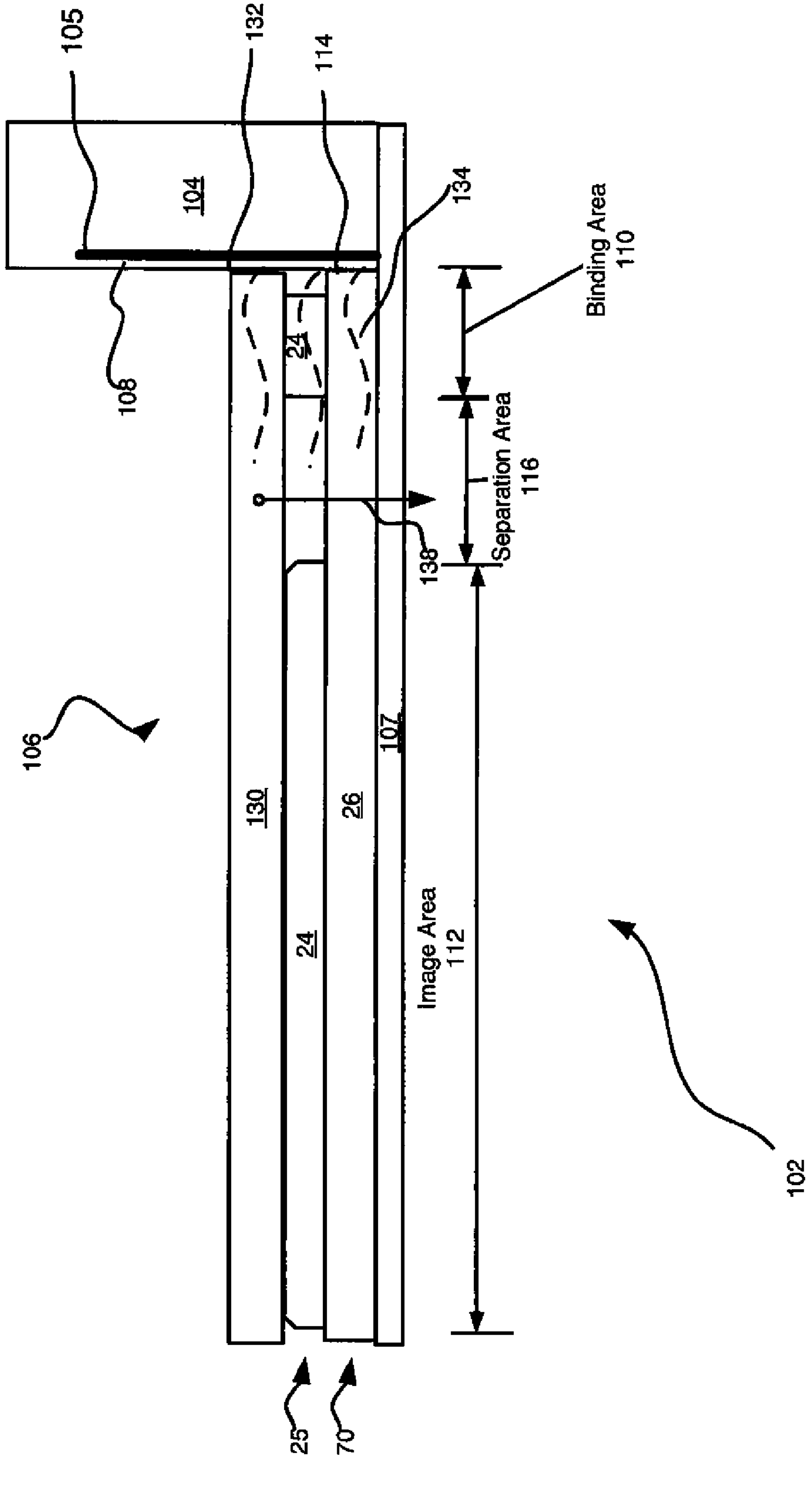
FIG. 5 shows the stacking system of FIG. 4 after fusing.
Figure 6:
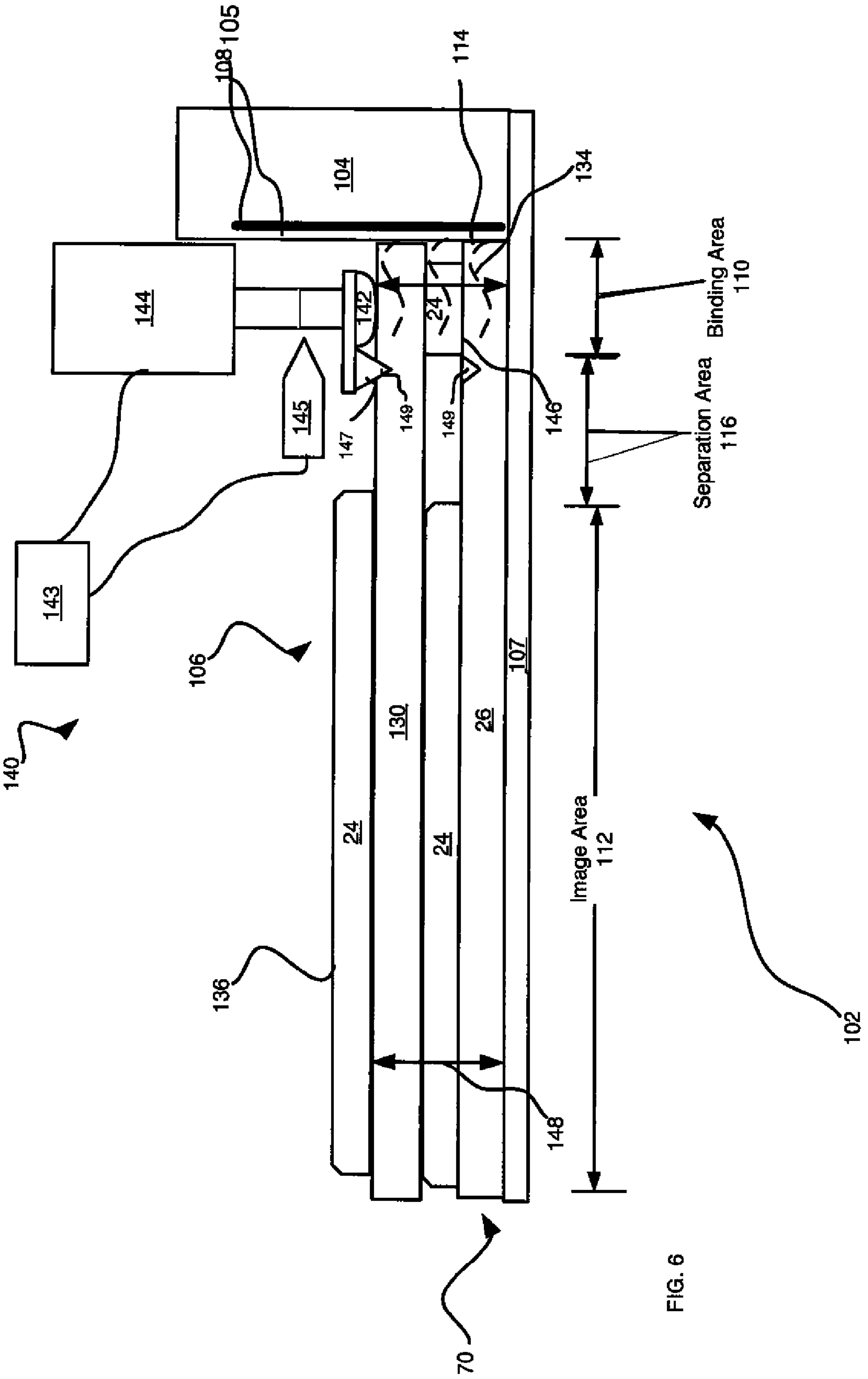
FIG. 6 shows a stacking system having a non-heating pressure system to pressurize the print and sheet during heating.

As is shown in FIG. 5, during fusing, toner 24 in binding area 110 can soften. In one embodiment, gravity 138 can draw sheet 130 into toner 24. Alternatively, as shown in FIG. 6, pressure system 140 having a pressure surface 142 such as a plate, roller, bar, pad or other surface and an actuator 144 such as a motor can be operated by pressure controller 143 to apply pressure across binding area 110 that urges sheet 130 to move to a defined position relative to base 107 and thereby define a stack height 146 formed by receiver 26, toner 24 and sheet 130 at binding area 110. It will be understood that prior to fusing, toner 24 in binding area 110 will comprise a fused solid mass that will have column strength sufficient to resist a first range of pressures applied by pressure surface 142 and actuator 144 and to hold pressure surface 142 at a first position. However, as toner 24 in binding area 110 fuses, toner 24 changes from a solid mass to a flexible mass that will yield to a pressure level that is within the first range of pressures causing sheet 130 to move from a position held by sheet 130 when supported by solid toner 24 in binding area 110. This allows pressure surface 142 to drive sheet 130 and print 70 such that pressure surface 142 is at a second position. Such flexibility also provides a reliable indication that toner 24 in binding area 110 has been fused. By monitoring the position of pressure surface 142 with a sensor 145 that detects the position of pressure surface 142, a pressure system controller 143 can accurately determine when toner 24 in binding area 110 has been fused and can interrupt the application of heat 134.

Sensor 145 can be any type of sensor that can detect a position of pressure surface 142 or any part of an apparatus that moves pressure surface 142. Non limiting examples of this include limit switches, Hall effect sensors, optical emitters/detectors, and positional tracking systems.

In another embodiment of this type, sensor 145 can comprise a sensor that can detect an upper surface of sheet 130 to detect when pressure surface 142 has moved sheet 130 to a second position to define a stack height of print 70 and sheet 130. Pressure system controller 143 can determine that the fusing is complete when such movement is detected. In this embodiment sensor 145 can be any type of sensor that can detect a change in a distance of sheet 130 relative to an initial position of sheet 130.

In another alternative embodiment, a similar result can be achieved by applying a pressure across the stack in the binding areas 110 that is required to compress fused toner 24 in binding area 110 to an extent necessary to position sheet 130 to define a predetermined stack height 146 for print 70 and sheet 130. If this is done before heat 134 is applied, a substantial amount of pressure will be required to overcome the aforementioned column strength of toner 24 in binding areas 110. However, once heat 134 is applied and toner 24 fuses, the amount of pressure required to hold sheet 130 in the desired position will decrease. In this embodiment, sensor 145 comprises a pressure sensor that can detect the amount of pressure required to hold pressure surface 142 in the desired position. Any type of conventional pressure sensor can be used for this purpose. Pressure system controller 143 monitors this pressure and, when there is a meaningful drop in such pressure, pressure system controller 143 can determine that toner 24 has fused and can send a signal that can cause controller 82 or heating system 104 to discontinue the application of heat 134. Pressure system controller 143 can be a stand alone controller for pressure system 140, or the function of pressure system controller 143 can be performed by controller 82.

As shown in FIG. 6, pressure surface 142 can be used to define a stack height 146 in binding area 110 that is sized to be consistent with a binding area 148 between in image area 110. However, this is not necessary and that pressure surface 142 can be operated to provide a wide range of stack heights 146 at binding area 110 as desired.

As is also shown in FIG. 6, sheet 130 has an optional toner image 136 formed thereon. As shown herein, toner image 136 is, for example, a cover image for a card formed by the bound combination of sheet 130 and print 70. As is also shown herein, toner image 136 is positioned within an image area 112 such that toner 24 forming toner image 136 does not fuse when heat 134 is applied.

As is further shown in FIG. 6, an optional scoring feature 149 is provided on pressure surface 142. Where scoring feature 147 is provided, pressure controller 143 or controller 82 causes actuator 144 to apply pressure separately to score print and sheet 130 to form scorings 149.

Figure 7:
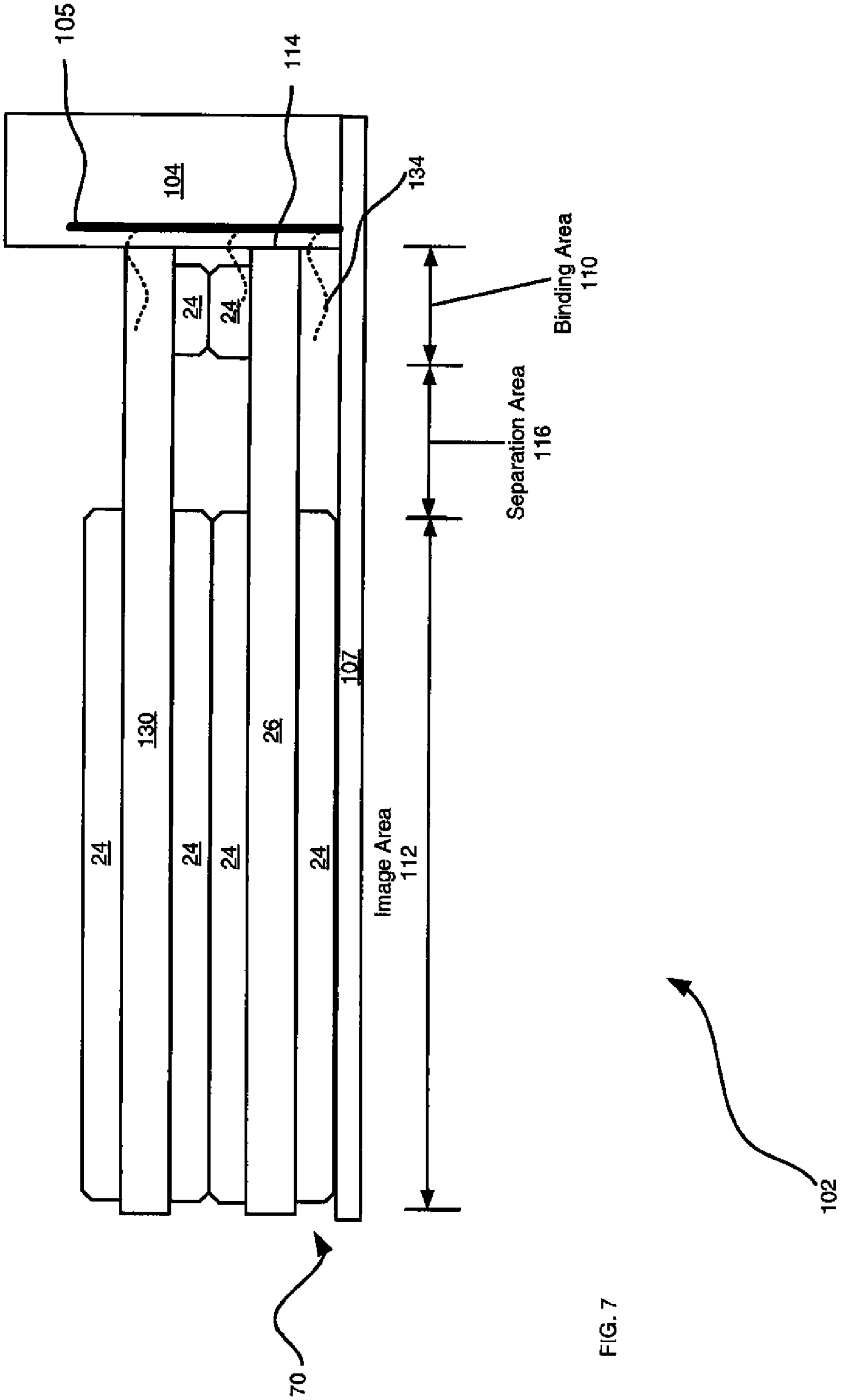
FIG. 7 shows a fused stack of two prints and a sheet to form an accordian fold.

FIG. 7 shows the embodiment of FIG. 5 wherein sheet 130 has optional toner 24 in a binding area 110, and in that sense comprises a second print. Further, as shown in FIG. 7, either of print 70 or sheet 130 can have toner 24 applied to form images in imaging area 112 in binding area 110 and optionally on both sides of print 70 and sheet 130. As is shown here, toner 24 is provided on sheet 130 between sheet 130 and print 70 to provide additional toner 24 for binding sheet 130 to print 70.

Figure 8:
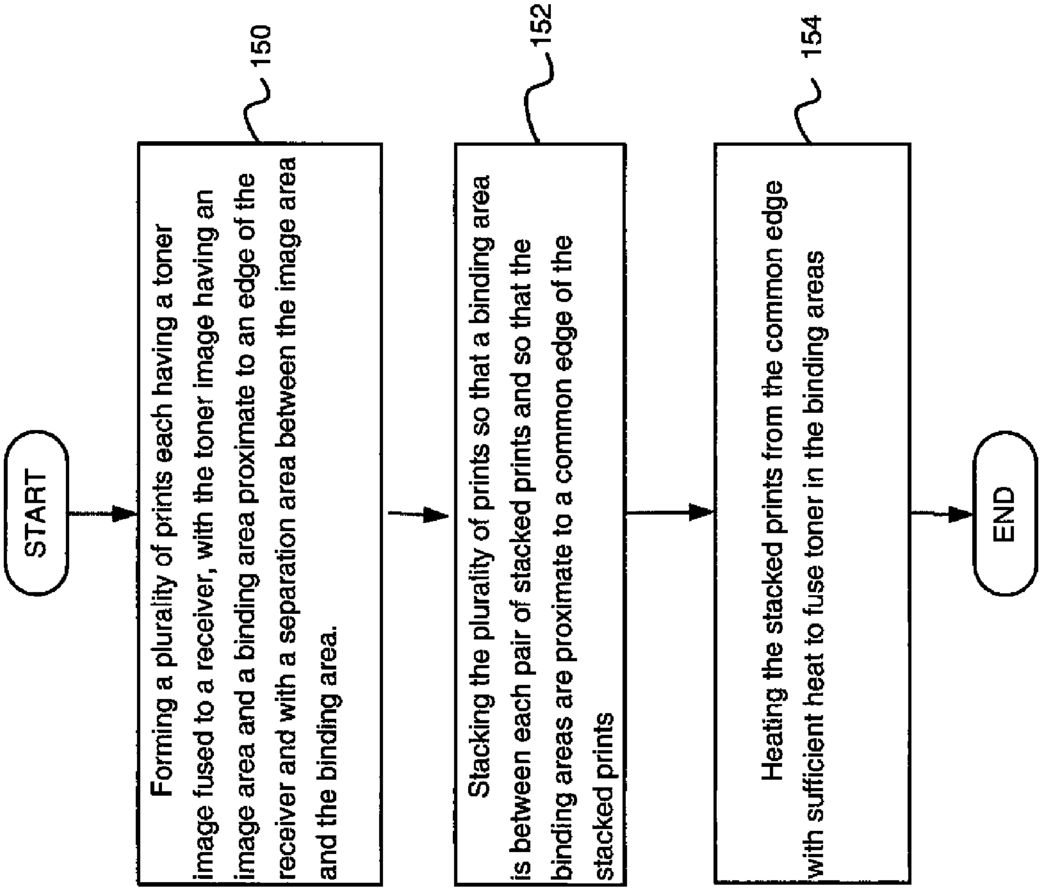
FIG. 8 shows another embodiment of a print binding method.
Figure 9:
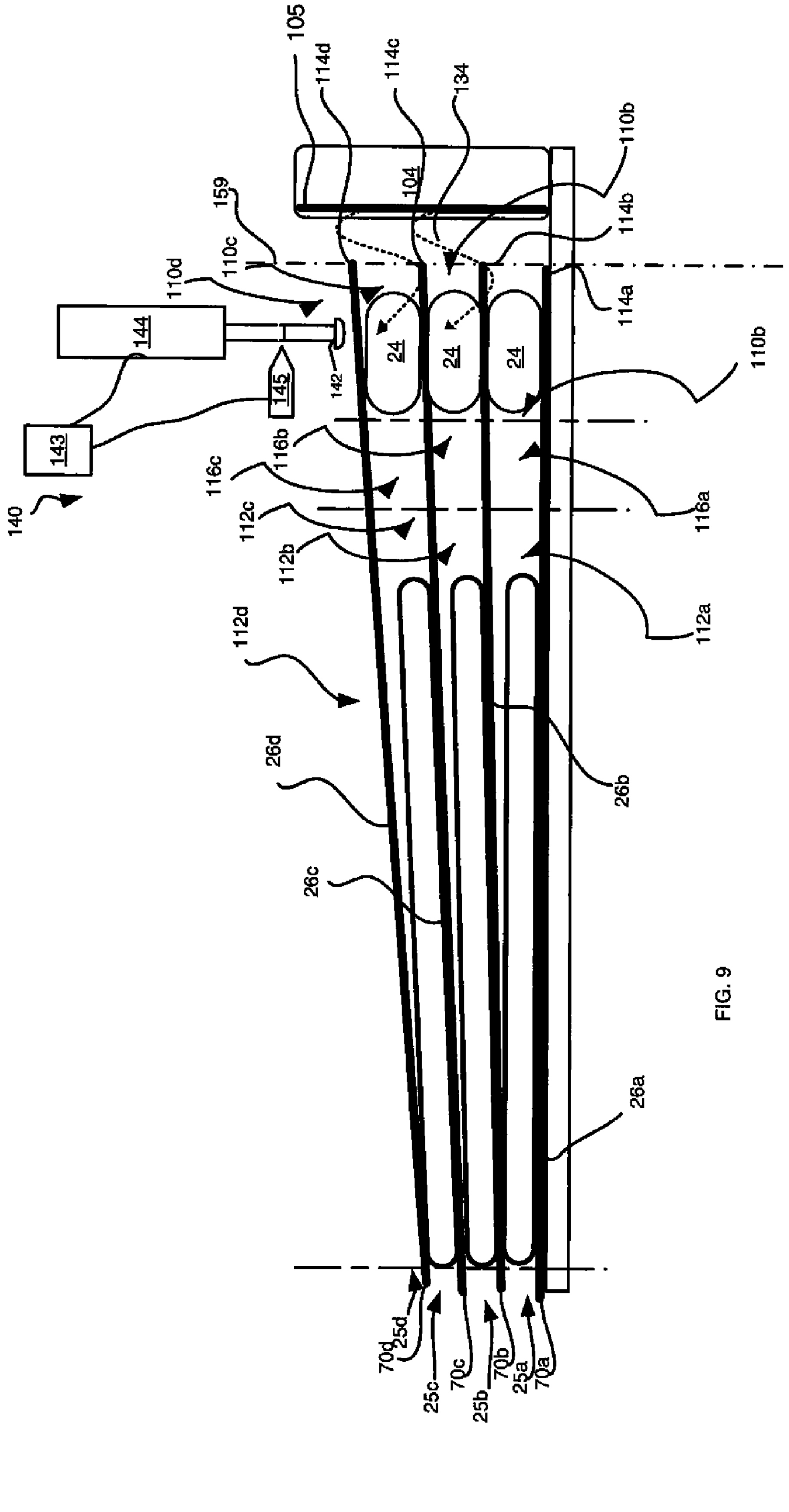
FIG. 9 shows a plurality of receivers in a stacking area before fusing.

FIG. 8 shows another embodiment of a method for forming bound electrophotographic prints. In the embodiment of FIG. 8, a plurality of prints 70 is formed. Prints 70 each have a toner images 25 fused to a receiver 26 (step 150). FIG. 9 shows an example of such a plurality of prints 70. In the example of FIG. 9, the plurality of prints 70 comprises prints 70*a*, 70*b*, 70*c*, and 70*d* having toner images 25*a*, 25*b*, 25*c* and 25*d* on receivers 26*a*, 26*b*, 26*c* and 26*d* respectively. Toner images 25*a*, 25*b*, 25*c* and 25*d* have an image portion 112*a*, 112*b*, 112*c* and 112*d* and a binding portion 110*a*, 110*b*, 110*c*, and 110*d* respectively. Binding portions 110*a*, 110*b*, 110*c* and 110*d* are proximate to an edge 114*a*, 114*b*, 114*c* and 114*d* of receivers 26*a*, 26*b*, 26*c* and 26*d* with separation areas 116*a*, 116*b*, 116*c* and 116*d* between image area 112*a*, 112*b*, 112*c* and 112*d* and binding portions 110*a*, 110*b*, 110*c* and 110*d* respectively.

Controller 82 causes toner images 25*a*, 25*b*, 25*c* and 25*d* to be printed so that toner 24 is provided in at least one of binding areas 110*a*, 110*b*, 110*c* and 110*d* to bind each of prints 70*a*, 70*b*, 70*c* and 70*d* to one of the other prints 70*a*, 70*b*, 70*c* and 70*d* when prints 70*a*, 70*b*, 70*c* and 70*d* are stacked and fused as will be discussed in greater detail below. This can be done in a variety of ways. In one embodiment (not shown) controller 82 causes each toner image 25 to include toner 24 in binding area 110*a*, 110*b*, 110*c* and 110*d* of each of a plurality of prints 70*a*, 70*b*, 70*c* and 70*d*.

However, in the embodiment illustrated in FIG. 8, controller 82 determines from print order information, or from other information, that prints 70*a*, 70*b*, 70*c* and 70*d* are to be printed and bound in a stacked arrangement along a common edge 159. Controller 82 then determines which binding areas 110*a*, 110*b*, 110*c* and 110*d* require toner 24 to achieve the desired binding. In such a stacked arrangement, controller 82 can determine that it is necessary to provide toner 24 between each pair of prints in the stack. Accordingly, controller 82 determines that prints 70*a*, 70*b*, and 70*c* require toner 24 in binding areas 110*a*, 110*b* and 110*c*. Thus, during the formation of prints 70*a*, 70*b* and 70*c*, controller 82 causes toner 24 to be positioned in binding areas 110*a*, 110*b*, and 110*c* and fused. As illustrated, controller 82 can optionally omit placing toner 24 in binding area 110*d* so as to conserve toner 24 or to avoid any potential consequences associated with toner 24 in binding area 110 without having print 70 or a sheet 130 to bond to such toner 24 during the heating.

The plurality prints 70 is then stacked for binding by stacking system 102 (step 152). In FIG. 9, this is done by stacking prints 70*a*, 70*b*, 70*c*, and 70*d* in a desired order for binding and such that binding areas 110*a*, 110*b*, and 110*c* are arranged between each pair of stacked prints 70. As shown in FIG. 9, print 70*a* is stacked with toner image 25*a* facing upwardly and print 70*b* is stacked on top of print 70*a* such that toner 24 printed in binding area 110*a* can fuse to bind prints 70*a* and 70*b*. Likewise, print 70*b* is stacked with toner image 25*b* facing upwardly and print 70*c* is stacked on top of print 70*b* such that toner 24 printed in binding area 110*b* can fuse to bind prints 70*b* and 70*c*. Further, print 70*c* is stacked with toner image 25*c* facing upwardly and print 70*d* is stacked on top of print 70*c* such that toner 24 printed in binding area 110*a* can fuse to bind prints 70*c* and 70*d*.

In one embodiment, controller 82 sequentially forms prints 70*a*, 70*b*, 70*c*, and 70*d* in a reverse binding order. However, this is not necessary and in other embodiments, controller 82 can print the plurality of prints 70*a*, 70*b*, 70*c* and 70*d* in any order and stacking system 102 can sort and order prints 70*a*, 70*b*, 70*c*, and 70*d* using any known stacking and sorting system or apparatus.

In this example, binding edges 114*a*, 114*b*, 114*c* and 114*d* are arranged such that they confront heating system 104 allowing for binding areas 110*a*, 110*b*, 110*c*, and 110*d* to be heated by heating system 104 from common edge 159 of a stack 156 formed by the stacked prints 70*a*, 70*b*, 70*c* and 70*d*.

Stack 156 is then heated at common edge 159 with sufficient heat to heat to fuse toner 24 in binding areas 110 (step 154). As shown in FIG. 9, common edge 159 of stack 156 is positioned proximate to and along side heat source 105 of heating system 104.

As described generally above, controller 82 determines a separation areas 116*a*, 116*b*, 116*c*, and 116*d* so that toner 24 that is applied to form an image on prints 70*a*, 70*b*, 70*c* and 70*d* is applied only in image areas 112*a*, 112*b*, 112*c*, and 112*d* that are separated from binding areas 110*a*, 110*b*, 110*c* and 110*d* by separation areas 116*a*, 116*b*, 116*b* and 116*d*. However, separation areas 116*a*, 116*b*, 116*c*, and 116*d* do not convey enough of heat 134 to image areas 112*a*, 112*b*, 112*c* or 112*d* to fuse toner 24 that is in image areas 112*a*, 112*b*, 112*c* and 112*d*.

Figure 10:
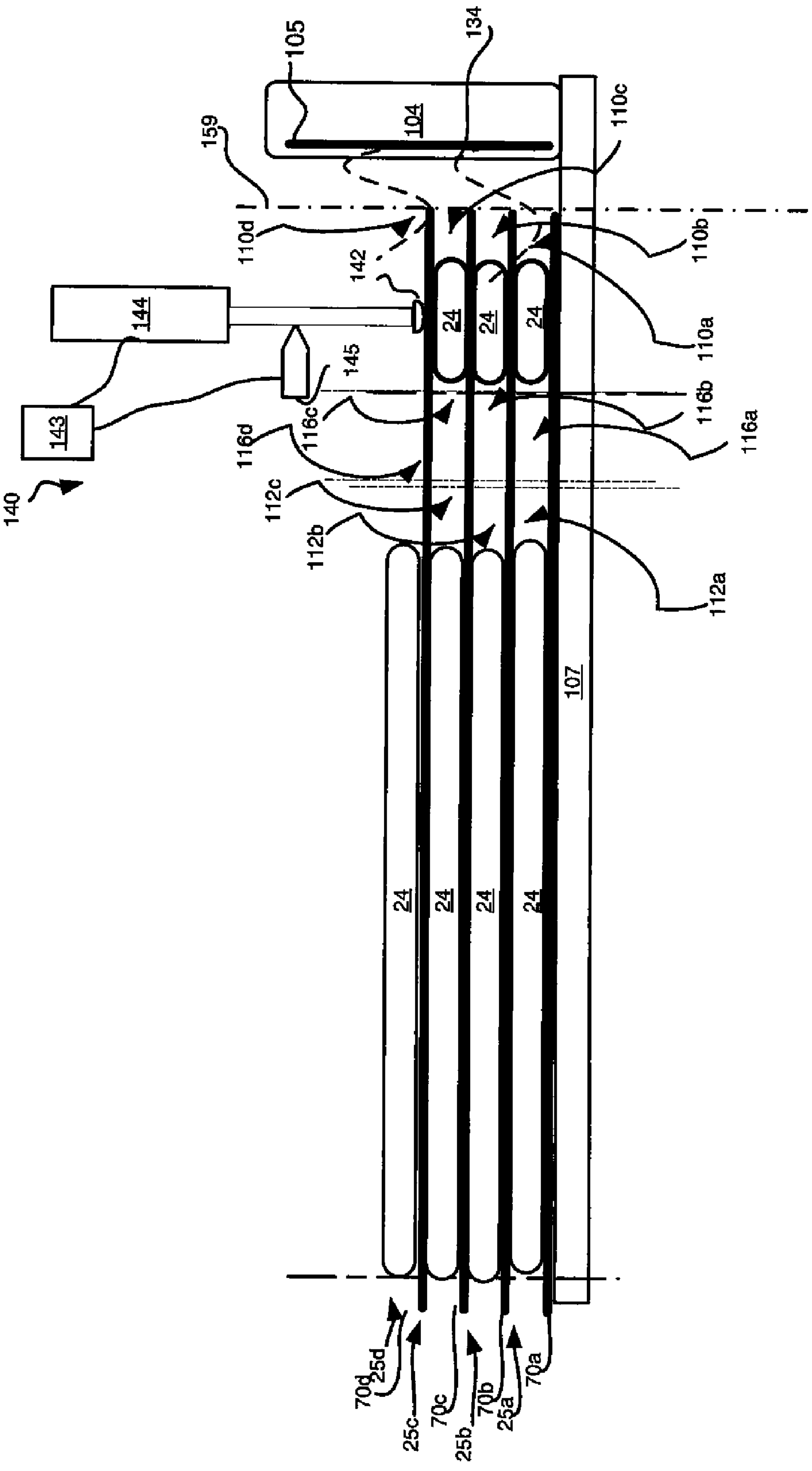
FIG. 10 shows a plurality of stacked and bound receivers in the stacking area.

As is also shown in FIGS. 9 and 10, a pressure system 140 can optionally be used in this embodiment as is generally described above. Pressure system 140 can also be used to detect when all of toner 24 in binding areas 110*a*, 110*b*, 110*c* and 110*d* is fused. It will be appreciated that heat 134 heats all of the toner 24 in the binding areas 110 along common edge 159 at essentially an even rate. To the extent that toner 24 in such binding areas 110 is generally laid down in the same fashion, toner 24 in binding areas 110*a*, 110*b*, 110*c*, and 110*d* will fuse generally at the same time. By using a sensor 145 to sense a change or a change in position of pressure surface 142, or print 70*d* as generally described above, the moment at which toner 24 in each of binding areas 110 fuses can be determined within moments allowing pressure system controller 143 (or controller 82) to stop heating stack 156 as soon as is practical.

As is also shown in FIGS. 9 and 10, pressure surface 142 can have an optional scoring feature 147 such as a blade or projection. Controller 82 or pressure system controller 143 can cause actuator 144 to apply pressure to the prints such as print 70*a* and 70*d* to score these prints as is known in the art.

In the embodiments discussed above, binding edge 114 of a print 70 is shown as an edge of a receiver 26. However, as is shown in FIG. 10, in any of the embodiments described herein, a print 70 can also be folded after printing and an edge formed by the folding can be used as a binding edge 114.

Such folding can be performed, for example by an optional automatic folding system 80 positioned between fuser 60 and binding system 100. Any known folding apparatus can be used for folding system 80 and the extent of the folding can vary to include but not be limited to bi-fold, tri-fold folding.

Figure 11:
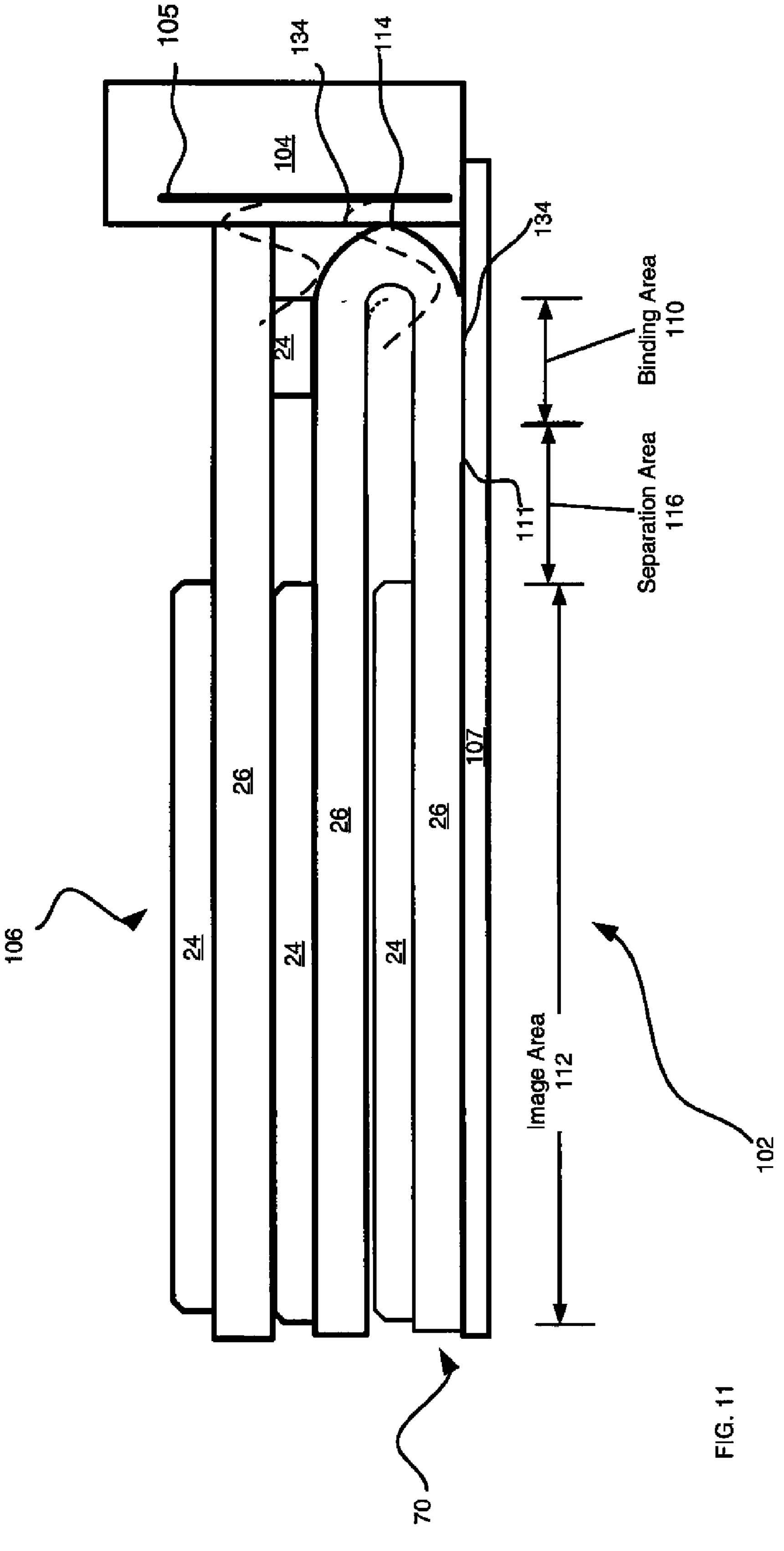
FIG. 11 shows another embodiment of a print binding method.

In any embodiment where print 70 is printed with toner 24 applied for binding print 70 to a sheet 130. Toner 24 that is applied for this purpose is positioned so that it will be located on an outer side 111 of the print 70 as print 70 is folded. Toner 24 on outer side 111 is also positioned so that this toner 24 will be within a binding area 110 that is defined from binding edge 114 at the fold. Similarly, toner 24 can be applied for image formation in image area 112 on either side of the fold in print 70. However, here too, any toner 24 applied for image formation is applied in an image area 112 separated from binding area 110 by a separation area 116. As is shown in FIG. 11, toner 24 applied in binding area 110 is positioned by stacking system 102 in stacking area 106 so that toner 24 in binding area 110 will be between folded receiver 26 and sheet 130 when both are positioned for binding in a stacking area 106 of stacking system 102 and heat 134 is applied by heating system 104.

Figure 12:
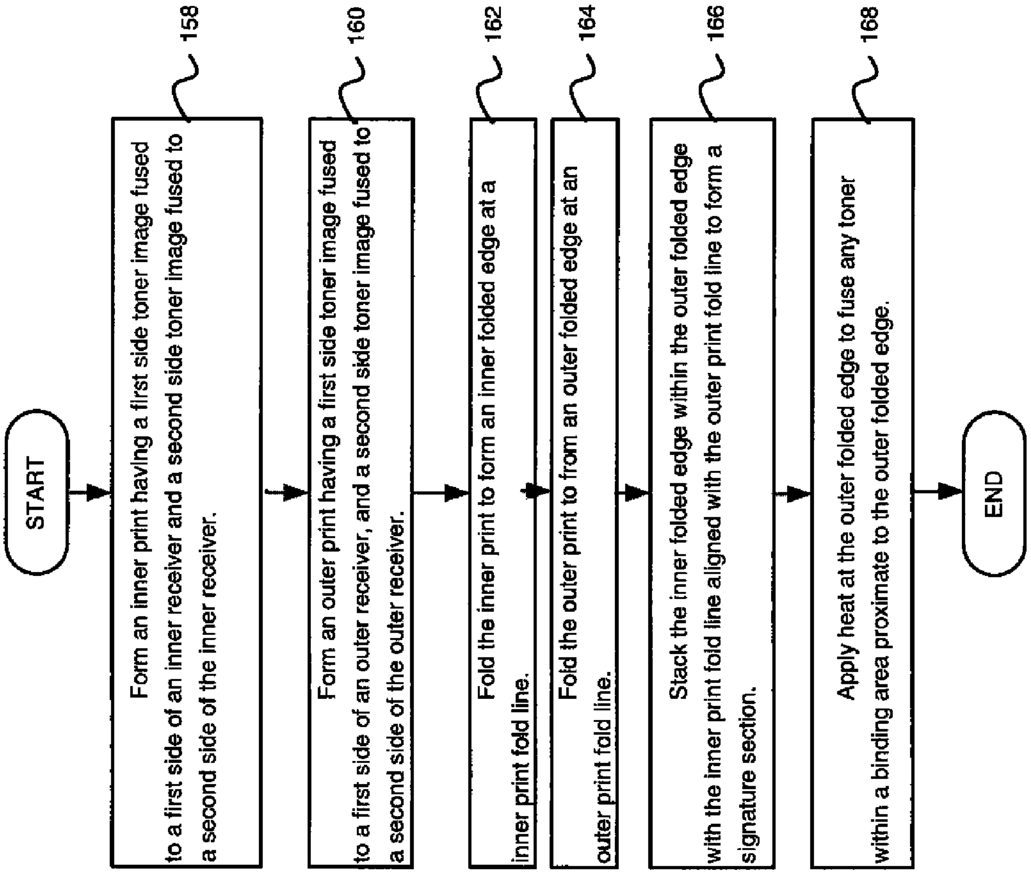
FIG. 12 shows another embodiment of a method for forming bound electrophotographic prints.
Figure 13:
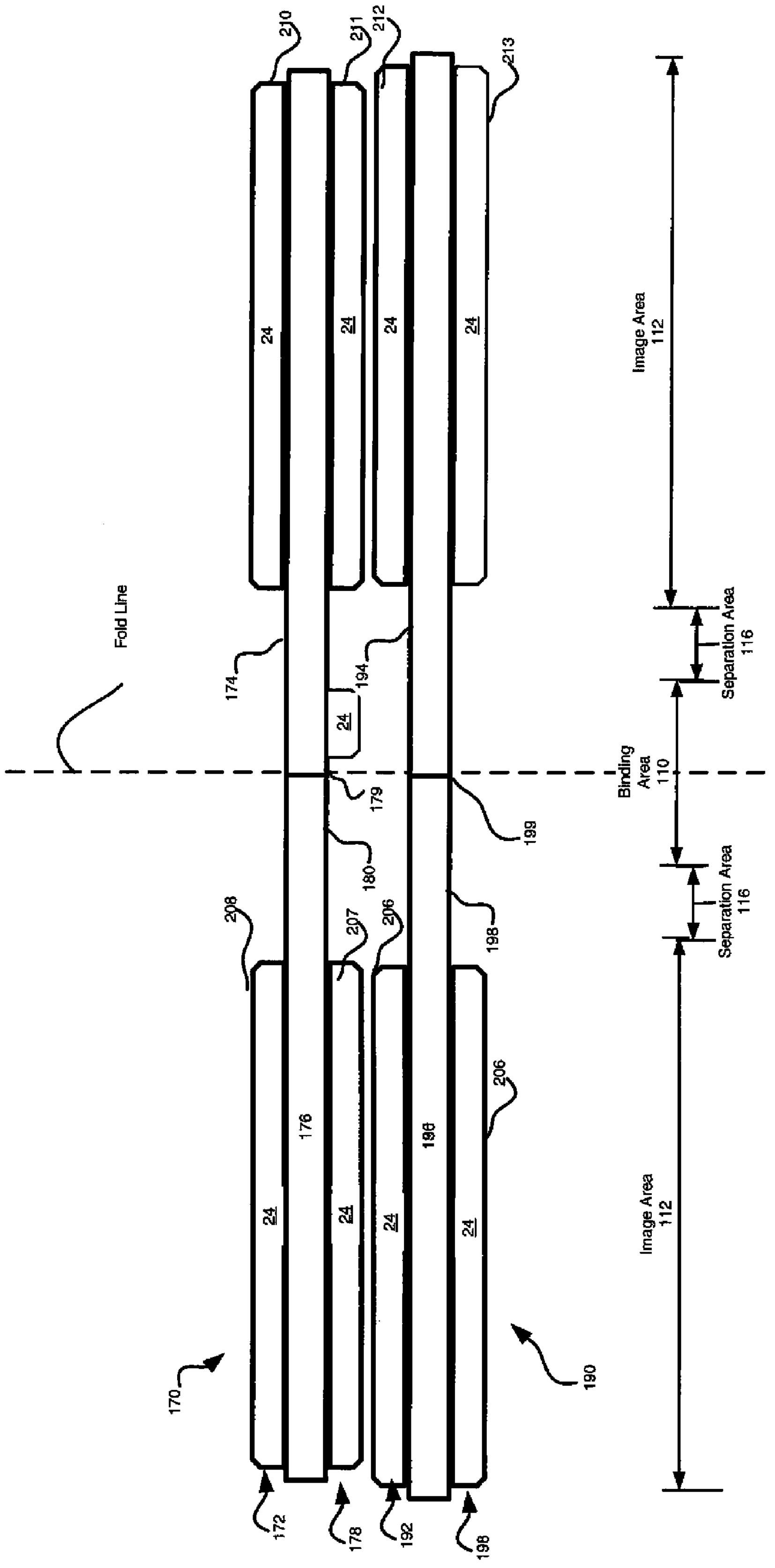
FIG. 13 illustrates embodiments of an inner print and an outer print.

FIG. 12 shows another embodiment of method for forming a bound stack of electrophotographic prints. In this embodiment, an inner print 170 is formed (step 158). Inner print 170 has a first side toner image 172 fused to a first side 174 of an inner receiver 176 and a second side toner image 178 fused to a second side 180 of the inner receiver 176 as is illustrated in FIG. 13.

An outer print 190 is formed (step 160). Outer print 190 has a first side toner image 192 fused to a first side 194 of an outer receiver 196 and a second side toner image 198 fused to a second side 200 of outer receiver 196 as is also illustrated in FIG. 13.

Figure 14:
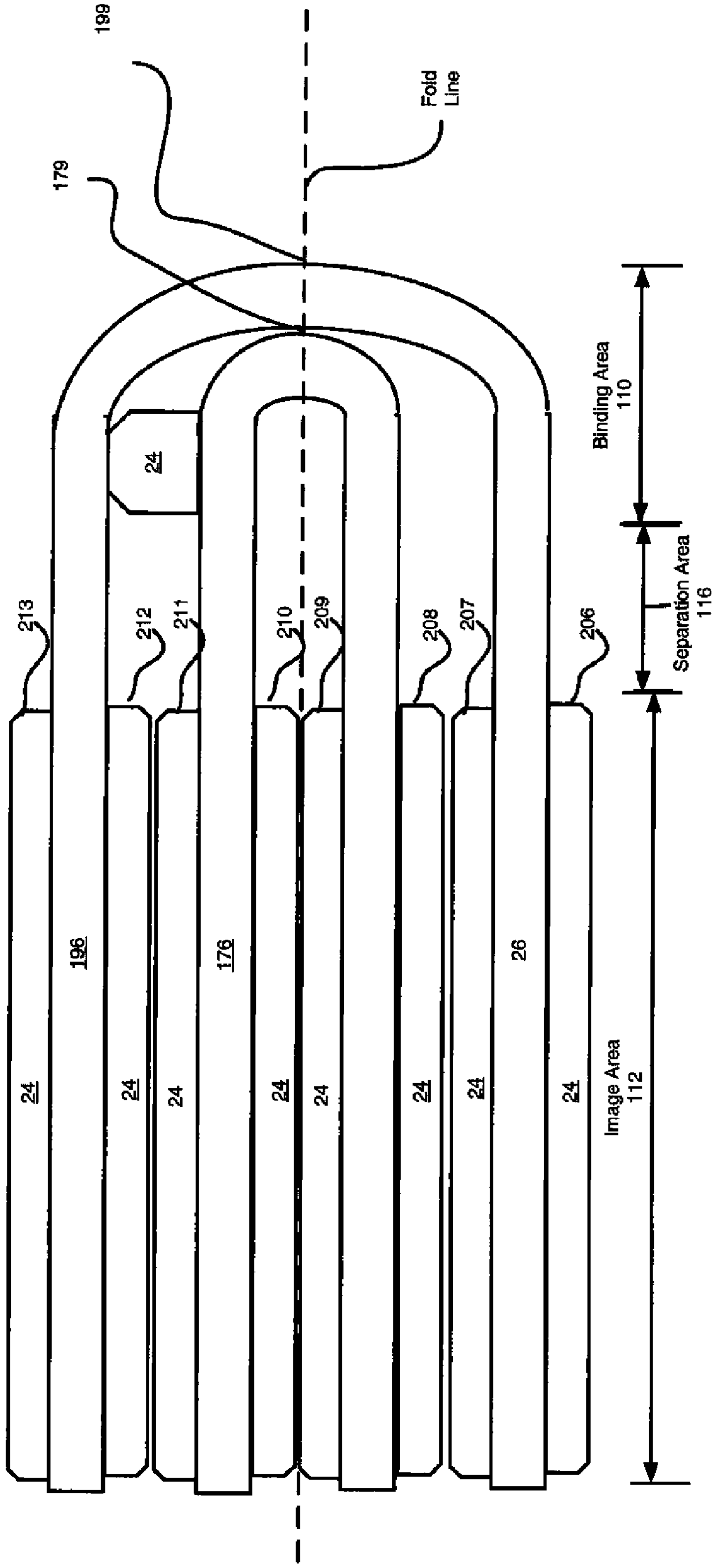
FIG. 14 shows an inner and outer sheet folded.

Inner print 170 is folded (step 162) to from an inner folded edge 179, the outer print 190 is folded (step 164) to form an outer folded edge 202 and inner print 170 and outer print 190 are then stacked with the inner folded edge 179 being within the outer folded edge 199 to form a signature section 200 (step 166) as shown in FIG. 14. Heat is applied at the outer folded edge to fuse a toner within a binding area proximate to the outer folded edge (step 168).

During at least one of these steps of forming an inner print (step 158) and of forming an outer print (step 160), controller 82 causes a toner image to be formed that provides the toner 204 that is in binding area 110 and that is between the inner print 170 and the outer sheet 190 as shown in FIG. 14. As shown in this embodiment, toner 204 in binding area 110 is provided by the second toner image 178 of inner print 170. However, it will be appreciated that in other embodiments the first side toner image 192 of outer print 190 can provide toner in binding area 110 that can be used to bind outer print 190 to inner print or that can combine with toner from the first toner image 172 of inner print 190 to provide the toner image.

Further, controller 82 forms toner images 172, 178, 192 and 198 such that toner 24 that is applied to form an image, shown for example, in FIGS. 13 and 14 as toner 24 arrangements 206, 207, 208, 209, 210, 211, 212, and 213 is provided only in areas that are separated from binding area 110 that is proximate to a binding edge defined along fold lines 179 and 199 by a separation area 116 that does not convey enough of the applied heat 134 to fuse image forming arrangements 206, 207, 208, 209, 210, 211, 212, and 213 of toner 24.

Figure 15:
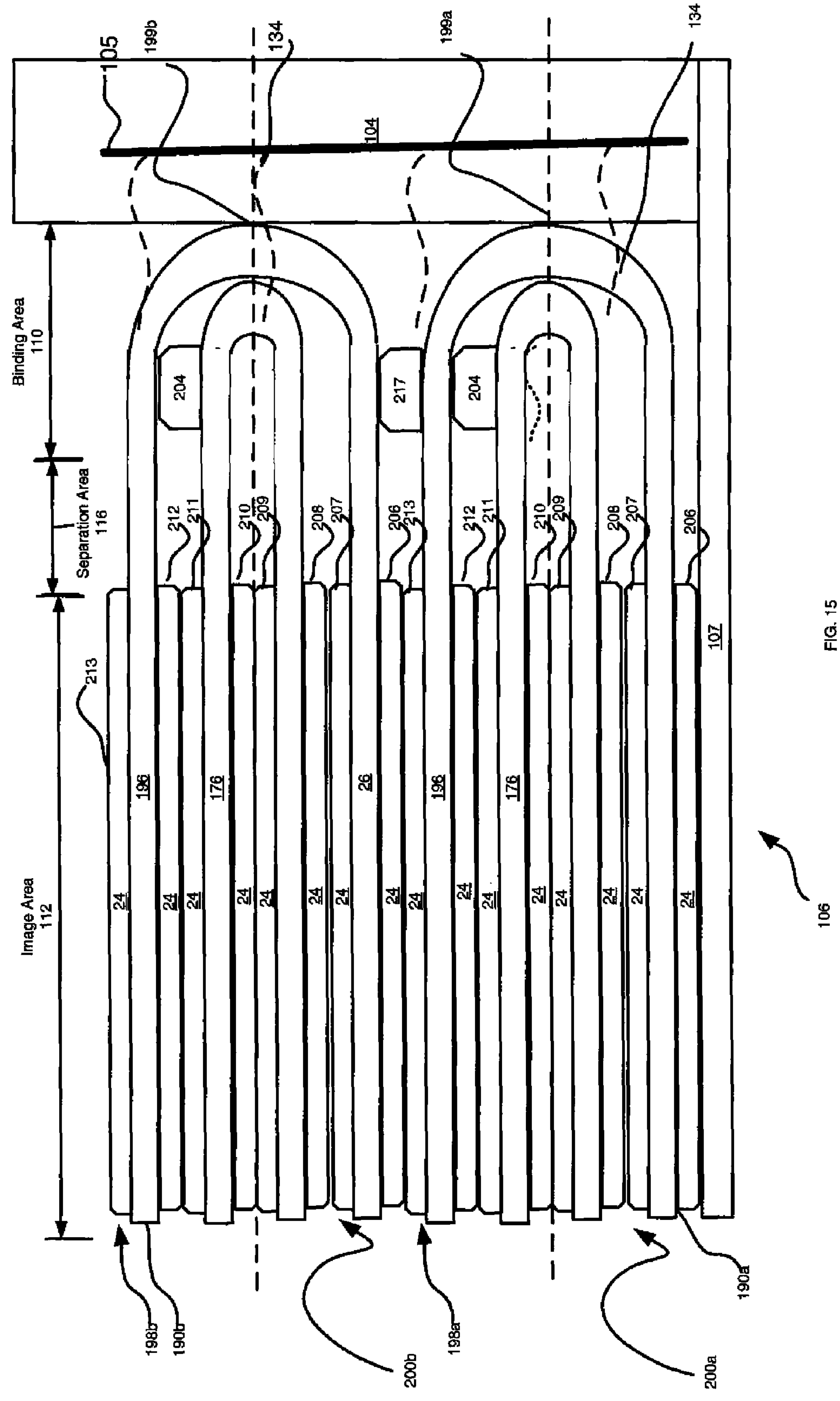
FIG. 15 shows a plurality of signature sections arranged for binding.

Optionally, controller 82 can cause the process of forming a signature section, steps 160-170 to be repeatedly performed to provide a plurality of signature sections 200*a* and 200*b* that can be stacked in stacking system 102 as is illustrated in FIG. 15. As shown, signature sections 200*a* and 200*b* are stacked in stacking area 106 with outer edges folded edges 199*a* and 199*b* aligned at a common edge 218 proximate to heating system 104. In this embodiment, controller 82 cause toner images to be formed that the second side toner image 198*a* or 198*b* for at least one of the outer prints 180*a* or 180*b* of signature sections 200*a* and 200*b* provides toner 24 such as toner 217 in a binding area 110 between each of the signature sections so that applied heat 134 causes toner to fuse between the signature sections 200*a* and 200*b*.

Figure 17:
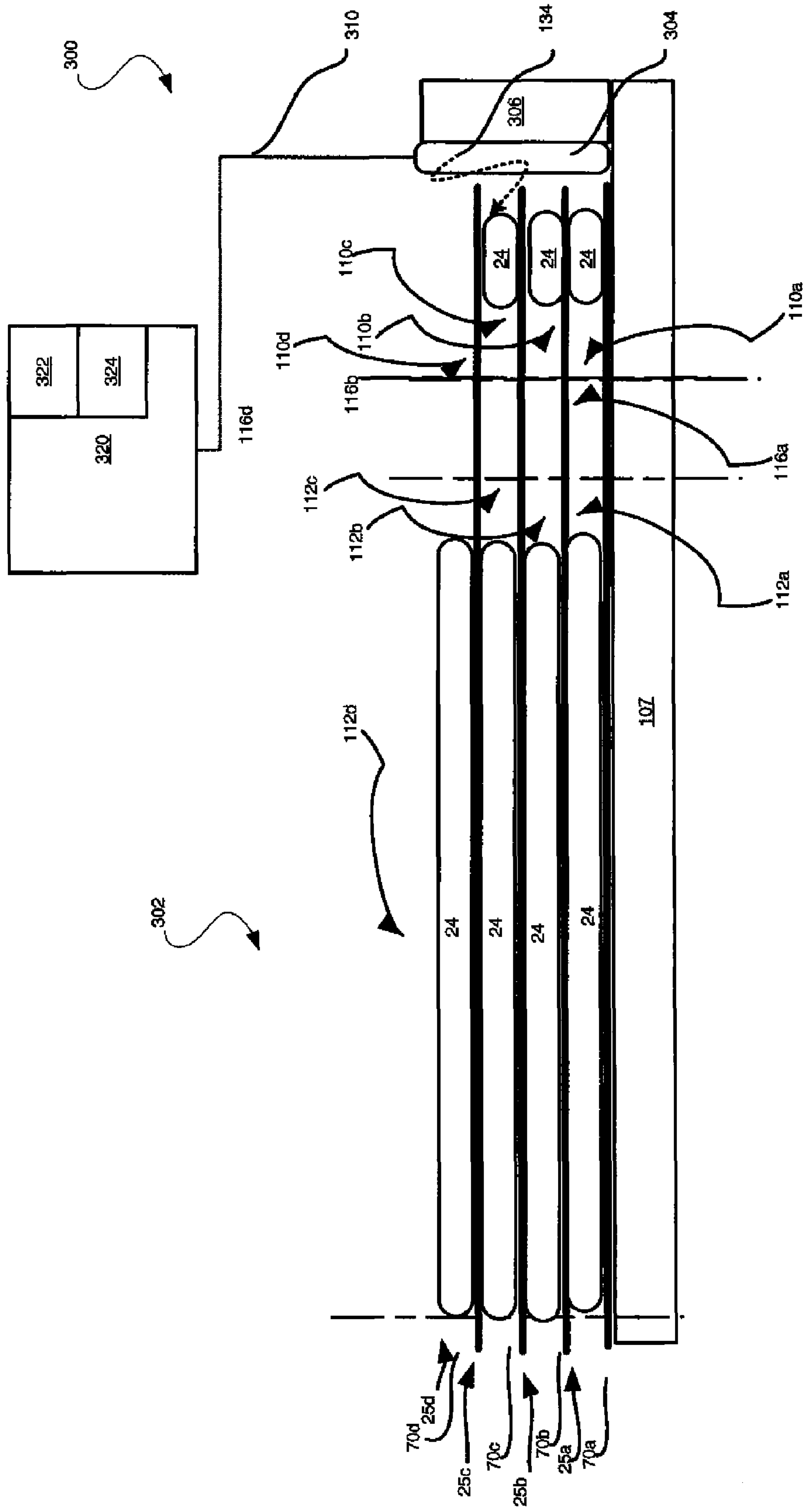
FIG. 17 shows an embodiment of an conversion insert for a conventional stacker system.

FIG. 17 shows a top view of another embodiment of a binding system 100; in this embodiment binding system 100 has a stacking system 102 having a stacking area 106 in which a stack of prints 70 can be provided having toner in a binding area 110. As is shown in this embodiment, binding system 100 has a heating system 104 with heat sources 230, 232, 234 and 236 that are positioned around a perimeter of stacking area 106. In this embodiment, heat sources 230, 232, 234 and 236 can be independently operated to apply heat toward one or more binding edges of the stack of receivers. Controller 82 can provide signals to a heating system controller 240 in heating system 104 from which heating system controller 240 can determine which of the heat sources 230, 232, 234 and 236 are to be activated. In this way binding can be selectively provided in stacking area 106 along any or all edges of a stack of prints 70 formed in stacking area 106.

Further, any of heat sources 230, 232, 234 and 236 can be segmented to provide, for example, multiple separately controllable heat sources along each edge of a stack of prints 70 in stacking area 106. This allows heat to be applied to selected parts of a common edge of a stack of prints where for example, binding need only be applied at certain points along a common edge. This can be done to simulate stapled, hole-punched, perforated, tear off or other non-continuous binding techniques known in the art. Such non-continuous binding along the binding edge also has the advantageous effect of lowering the overall heat applied to the stack of prints further reducing the risk that the heat applied for binding will fuse toner that is applied to the prints to form images. However, heat applied by across the entire thickness of any heated portion of a non-continuous binding heat.

In another example, heat sources 230, 232, 234, and 236 can be used to provide binding on opposing sides of adjacently stacked pages so as to provide a pull out, accordion fold or other folding effect, without actually having folded the document. It will be appreciated that in any embodiment where binding heat is to be provided along more than one edge of a print or stack of prints, the toner images for the prints in the stack will be adapted to provide a separation area 116 as generally described above to separate a binding area in which toner can be applied proximate to one of the binding edges from an image area to protect toner 24 that is applied for the purpose of image formation from heat applied to fuse the toner 24 in the binding area.

Heat sources such as heat sources 105, 230, 232, 234, and 236 used in heating system 104 can take any number of forms and can comprise, for example, any known source of heat that can be applied along a thickness of a stack of two or more prints 70. In some embodiments electrical heating is preferred and in such embodiments, electrical contact, convection or radiant heat sources including but not limited to resistive heated plates or surfaces, heated air or resistive tapes and the like.

In certain embodiments heating system 104 has heat sources 105, 230, 232, 234 and 236 that take the form of insertable heating elements that are sized and shaped to be inserted in a stacking area 106, and that extend along a vertical dimension of stacking area 106 to a sufficient length to heat any toner 24 in any binding portions of an entire stack of prints 70 formed in stacking area 106. This helps to provide concurrent heating of all toner in the binding area of a stack. It will also be appreciated that this can be done so that binding can be applied along more than one side of a stack of prints. For example, it will be appreciated that it may be useful to provide binding toner along more than one side of the stack so as for example to form an envelope.

FIG. 17 shows still an embodiment of a system 100 for producing bound electrophotographic prints using a conversion insert 300 for converting a conventional stacking area 302 for a conventional electrophotographic printer (not shown) into a binding system 100. In this embodiment, conversion insert 300 has at least one insertable heater 304 that can be inserted along a stacking wall 308 of the stacking area 302, and conductors 310 that provide an electrical connection to a control unit 320 that has communication circuit 322 that is adapted to receive signals from a printer controller 82 by wired or wireless means and a power control circuit 324 that controllably supplies power from a source (not shown) to insertable heater 304. The signals received from control unit 320 can include a simple on or off signal which cause control unit 320 to cause power control circuit 324 to provide power along conductors 310 to provide heating power to the insertable heater 304 and then to later discontinue providing power to insertable heater 304. In such an embodiment, controller 82 determines when heat is to be applied by insertable heater 304 and for how long. Optionally, control unit 320 and communication circuit 322 can be adapted to receive an activation signal from controller 82 and can apply a predetermined amount of heat or apply a known heat for a predetermined time period sufficient to cause binding of toner 24 in a binding area 110 to fuse.

Figure 16:
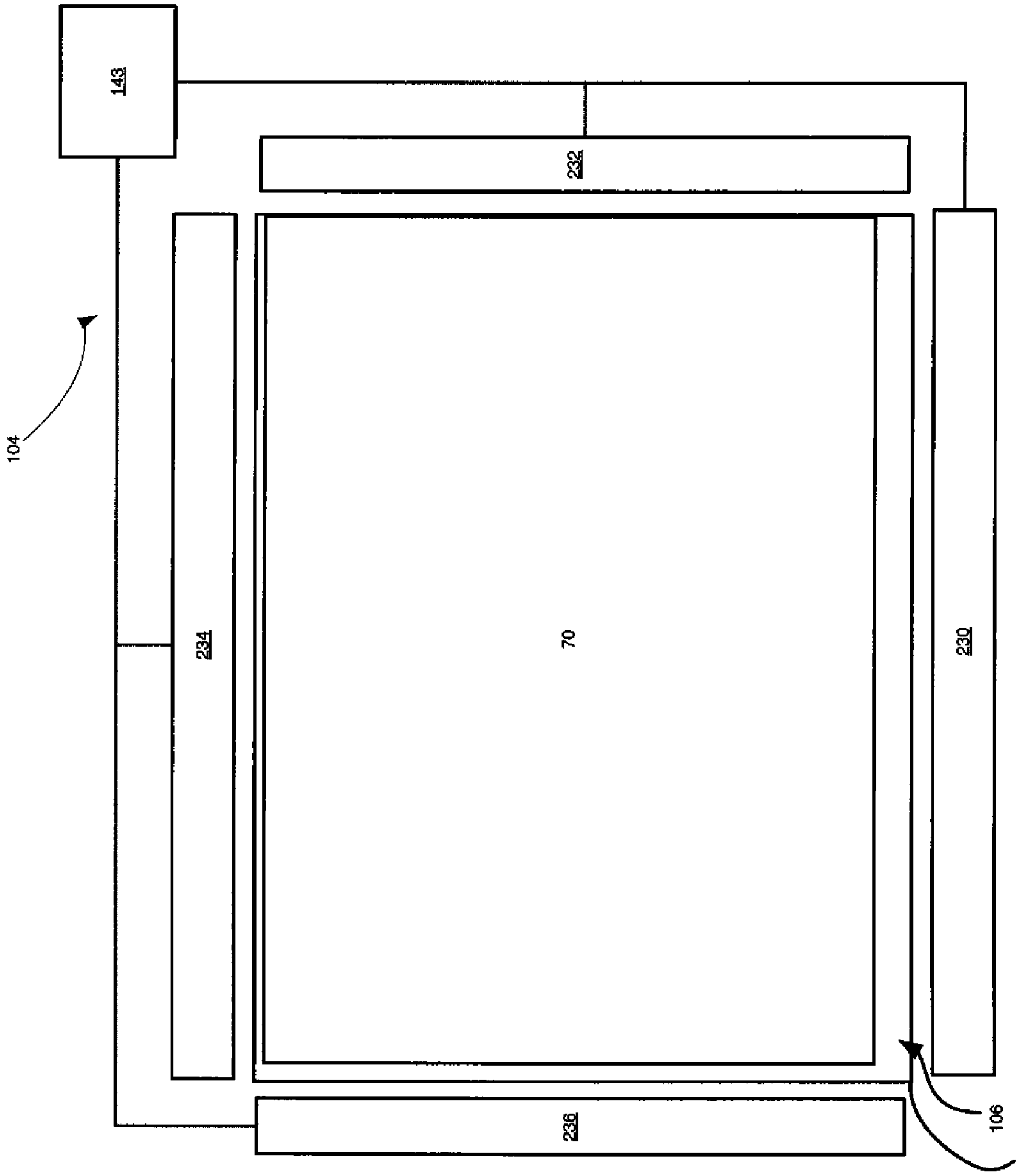
FIG. 16 shows a top view of another embodiment of a binding system.

In still other embodiments, control unit 320 and communication circuit 322 can receive signals from a controller 82 indicating that one of a plurality of different heating profiles that define for example a heat intensity or a pattern of heat to be applied over time and that can be used to heat prints 70 in stacking area 106 to cause heating to be performed in accordance with the heating profile. In further embodiments, more than one insertable heater 304 can be provided on different walls of stacking area 106 as is generally illustrated and discussed above with respect to FIG. 16 and in this embodiment, control unit 320, communication circuit 322, and power control circuit 324 are adapted to control the application of power to a selectable set of the plurality of insertable heaters 304 so as to provide binding heat along any or all of the walls so as to heat the stack from any side.

Accordingly, when printer controller 82 determines that a stack of prints is to be formed and bound, printer controller 82 causes prints 70*a*, 70*b*, 70*c*, and 70*d* to be printed having a toner 24 in a binding area 110 relative to a binding edge 114, and causes prints 70*a*, 70*b*, 70*c*, and 70*d* to be printed with a toner 24 area in to form images in image area 112*a*, 112*b*, 112*c*, and 112*d* such that the heat 134 provided by insertable heater 304 will fuse toner 24 in binding area 110, causes the prints to be stacked in the stacking area and has communication system 90 transmit a signal that can be sensed by communication circuit 222 and that control unit 320 can use determine when and from what side of the stack heat 134 is to be provided.

The invention has been described in detail with particular reference to certain preferred embodiments thereof, but it will be understood that variations and modifications can be effected within the spirit and scope of the invention.

PARTS LIST

20 printer
22 print engine
24 toner
25*a* toner image
25*b* toner image
25*c* toner image
25*d* toner image
26 receiver
28 receiver transport
30 surface
32 receiver supply
36 motor
38 rollers
40 printing station
42 printing station
44 printing station

46 printing station
48 printing station
50 transfer subsystem
52 cleaning mechanism
60 fuser
70 print
70*a* print
70*b* print
70*c* print
70*d* print
80 automatic folding system
82 controller
84 user input system
86 sensors
88 memory
90 communication system
92 external device(s)
94 output system
100 binding system
102 stacking system
104 heating system
105 heat source
106 stacking area
107 base
108 reference surface
110 binding area
112 image area
114 binding edge
116 separation area
120 apply toner step
122 fuse toner step
124 stack step
126 apply heat step
130 sheet
132 binding edge
134 heat
138 gravity
140 pressure system
142 pressure surface
143 pressure system controller
144 motor
145 sensor
146 stack height
147 scoring feature
148 binding area
149 scoring mark
150 print stack
152 imaging area stack height
154 heating
158 common edge
159 inner print
160 form outer print step
162 fold inner print step
164 fold outer print step
166 stack step
168 heat step
170 inner print
172 first side toner image
174 first side
176 inner receiver
178 second side toner images
179 inner folded edge
180 second side
190 outer print
192 first side toner image
194 first side
196 outer receiver
197 second side of outer print
198 second side
199 outer folded edge
199*a* outer folded edge
199*b* outer folded edge
200 signature section
200*a* signature section
200*b* signature section
206 image forming arrangements of toner
207 image forming arrangements of toner
208 image forming arrangements of toner
209 image forming arrangements of toner
210 image forming arrangements of toner
212 image forming arrangements of toner
213 image forming arrangements of toner
217 toner in binding area
230 heater
232 heater
234 heater
236 heater
300 insert system
304 insertable heater
306 stacking wall
310 conductors
320 control unit
322 communication circuit
324 power control circuit

What is claimed is:

1. A method for forming bound electrophotographic prints comprising the steps of:

applying a toner to a receiver to form a toner image having toner in a binding area and in an image area, the binding area is proximate to a binding edge of the receiver and the image area that is separated from the binding area by a separation area;

fusing the toner image to form a print;

stacking a sheet and the print with the toner in the binding area of the print confronting the sheet along a binding edge of the sheet; and applying heat at the binding of the sheet and the binding edge of the print to cause the toner in the binding area to fuse for a second time;

wherein a residual portion of the applied heat heats the separation area but the separation area does not heat the image area to an extent sufficient to fuse toner in the image area for a second time.

2. The method of claim 1, wherein receiver in the separation area has sufficient thermal capacity to absorb and to emit enough of the residual portion of the applied heat to allow the receiver in the separation area to heat without conveying enough of the residual portion to the image area to cause toner in the image area to fuse for a second time.

3. The method of claim 1, wherein the receiver in the separation area has sufficient thermal capacity to absorb enough of the residual portion of the applied heat to allow the receiver in the separation area to heat without conveying enough of the residual portion to the image area to fuse toner in the image area for a second time.

4. The method of claim 1, wherein size of the separation area is based upon at least one of the thermal transfer characteristics of receiver in the separation area, the thermal emission characteristics of the receiver in the separation area, the thermal transfer characteristics of the receiver in the separation area, the thermal conductivity of the receiver in the separation area, the thermal characteristics of an environment surrounding the receiver in the separation area, and the amount of toner applied in the binding area.

5. The method of claim 1, wherein pressure is applied to press the print and sheet toner together wherein the heat is applied through the binding edge of the sheet and the binding edge of the print.

6. The method of claim 1, wherein the applied heat is provided by a source positioned along the binding edge of the sheet and the binding edge of the print.

7. The method of claim 1, wherein the heat is applied at substantially the same time across the binding edge of the sheet in the binding edge of the print.

8. The method of claim 1, further comprising the steps of applying a pressure through the stacked print and sheet at the binding area, detecting when the applied pressure causes a stack height of the print and the sheet to decrease, and determining that fusing has occurred when a decrease in the stack height is detected.

9. The method of claim 1, further comprising the steps of applying a pressure through the stacked print and sheet at the binding area to define a predetermined stack height of the print and the sheet, determining when an amount of pressure required to define the predetermined stack height of the print and the sheet decreases and determining that fusing has occurred based upon the determined decrease in pressure.

10. A method for providing bound electrophotographic prints comprising the steps of:

forming a plurality of prints each having a receiver with toner fused in a binding area proximate to a binding edge of the receiver and toner fused to the receiver in an image area, with a separation area between the image area and the binding area;

stacking the plurality of prints so that a binding area is between each pair of stacked prints and so that the binding edges are proximate to a common edge of the stacked plurality of prints; and heating the stacked plurality of prints from the common edge with sufficient heat to fuse toner in the binding areas;

wherein the separation areas do not transfer enough heat from the binding edges to the image areas during the heating of the plurality of stacked prints to allow heat from the common edge to fuse the image areas.

11. The method of claim 10, further comprising the step of applying pressure across the stacked plurality of prints in the binding area during heating.

12. The method of claim 10, further comprising the step of folding the prints to form a folded edge before stacking wherein the stacking step comprises stacking folded sheets within each other at the folded edges and wherein the binding areas are provided proximate to the folded edges.

13. The method of claim 10, wherein at least one of the plurality of prints is folded at a fold line before the stacking, wherein the fold line comprises a binding edge for the folded print.

14. The method of claim 10, further comprising the steps of applying a pressure through the stacked plurality of prints at the binding area and detecting when the applied pressure causes a stack height of the stacked plurality of prints to decrease, and determining that fusing has occurred when the change in stack height is detected.

15. The method of claim 10, further comprising the steps of applying pressure across the stacked plurality of prints in the binding area during heating so as to drive the thickness of the stacked plurality of prints at the start of heating to a predetermined stack height and sensing an amount of pressure applied to hold the stack at the predetermined stack height, and determining that fusing has occurred based upon the sensed amount of pressure.

16. A printing method comprising the steps of:

forming an inner print having a first side toner image fused to a first side of an inner receiver and a second side toner image fused to a second side of the inner receiver;

forming an outer print having a first side toner image fused to a first side of an outer receiver, and a second side toner image fused to a second side of the outer receiver;

folding the inner print to form an inner folded edge;

folding the outer print to form an outer folded edge;

stacking the inner folded edge within the outer folded edge to form a signature section; and applying heat at the outer folded edge to fuse any toner within a binding area proximate to the outer folded edge;

wherein at least one of toner images provides the toner in the binding area and wherein the forming steps further provide toner to form images only in image areas that are separated from the outer folded edge by a separation area that does not convey enough of the heat to fuse the toner in the image areas.

17. The printing method of claim 16, wherein said steps of forming, and folding and stacking are further performed to provide a plurality of signature sections, the signature sections are stacked with outer folded edges aligned, and a second side toner image for at least one of the signature sections provides toner in the binding area between each of the signature sections so that the applied heat causes the toner between the signature sections to fuse.

* * * * *